(12) United States Patent
Itoko et al.

(10) Patent No.: US 9,069,871 B2
(45) Date of Patent: Jun. 30, 2015

(54) SYSTEM, METHOD, AND PROGRAM FOR GENERATING WEB PAGE

(75) Inventors: Toshinari Itoko, Kanagawa-ken (JP); Takahide Nogayama, Kanagawa-ken (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 137 days.

(21) Appl. No.: 13/237,992

(22) Filed: Sep. 21, 2011

(65) Prior Publication Data

US 2012/0079361 A1     Mar. 29, 2012

(30) Foreign Application Priority Data

Sep. 27, 2010    (JP) ................. 2010-214942

(51) Int. Cl.
    *G06F 17/22*     (2006.01)
    *G06F 17/30*     (2006.01)

(52) U.S. Cl.
    CPC ...... *G06F 17/3089* (2013.01); *G06F 17/30887* (2013.01)

(58) Field of Classification Search
    USPC .................. 715/234, 239, 241, 242, 243, 248
    See application file for complete search history.

(56) References Cited

U.S. PATENT DOCUMENTS

| | | | |
|---|---|---|---|
| 6,907,429 B2* | 6/2005 | Carneal et al. ................. | 1/1 |
| 7,454,434 B1* | 11/2008 | Cohen et al. ................... | 1/1 |
| 7,580,973 B2* | 8/2009 | Falk et al. ...................... | 709/203 |
| 7,617,294 B1* | 11/2009 | Harding ......................... | 709/217 |
| 8,078,691 B2* | 12/2011 | Zhang et al. ................... | 709/218 |
| 8,103,742 B1* | 1/2012 | Green ............................ | 709/218 |
| 2009/0063621 A1* | 3/2009 | Cheng et al. ................... | 709/203 |

FOREIGN PATENT DOCUMENTS

| | | |
|---|---|---|
| JP | 2001-034527 | 2/2001 |
| JP | 2001-356957 | 12/2001 |
| JP | 2002-222165 | 8/2002 |
| JP | 2006-518887 | 8/2006 |
| JP | 2009-110216 | 5/2009 |
| JP | 2010017018 | 1/2010 |
| JP | 2010-170182 | 8/2010 |
| JP | 2010537337 | 12/2010 |
| WO | WO2009/027256 | 3/2009 |

* cited by examiner

*Primary Examiner* — Stephen Hong
*Assistant Examiner* — Wilson Tsui
(74) *Attorney, Agent, or Firm* — Tutunjian & Bitetto, P.C.; Jennifer R. Davis

(57) ABSTRACT

A method, article, and system for reconfiguring a web page. The method includes extracting dependencies between pages, files, and components of the web page, measuring a network delay value, a transfer efficiency value, and a component size, estimating load time of a candidate file using information of the network delay value, the transfer efficiency value, the dependencies, and the component size. An integer programming problem is generated to minimize an object function representing the load time of the web page by analyzing the web page, solving the integer programming problem, reconfiguring a library file from the solution and reconfiguring the web page by replacing a link to the library file of each page with a link to the reorganized file.

18 Claims, 35 Drawing Sheets

FIG. 12(a)
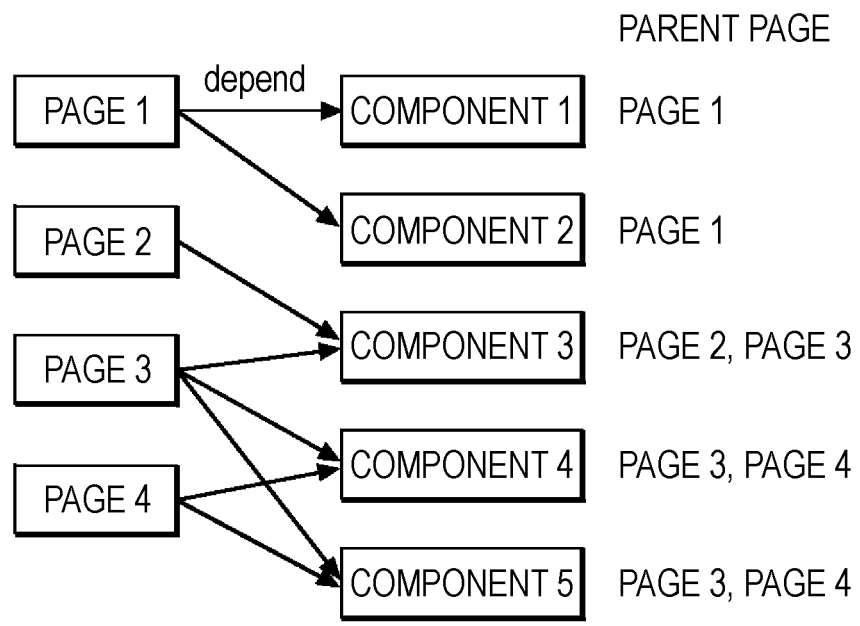
FIG. 12(b)
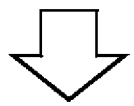
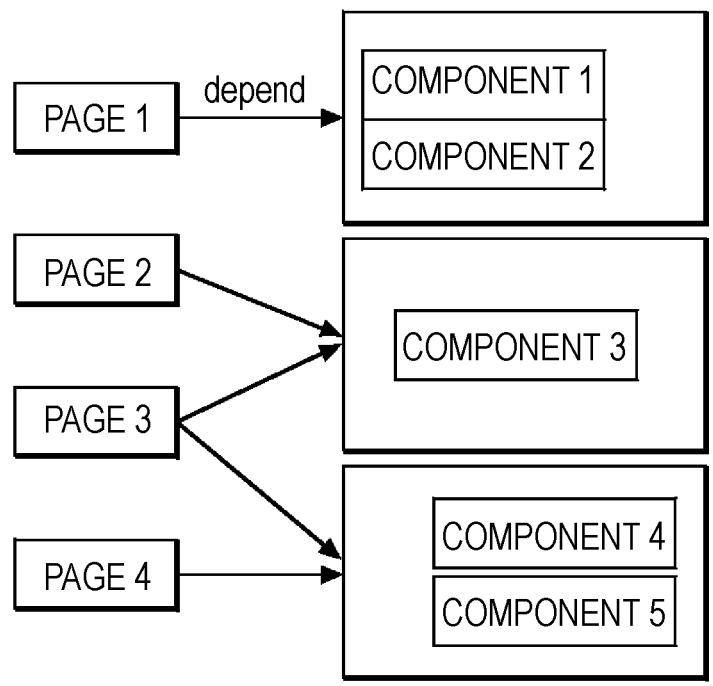

FIG. 14
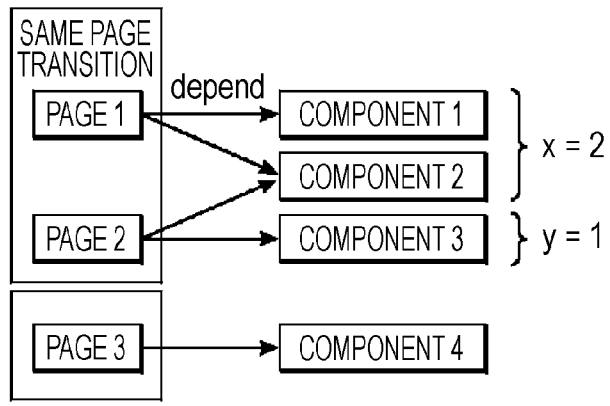
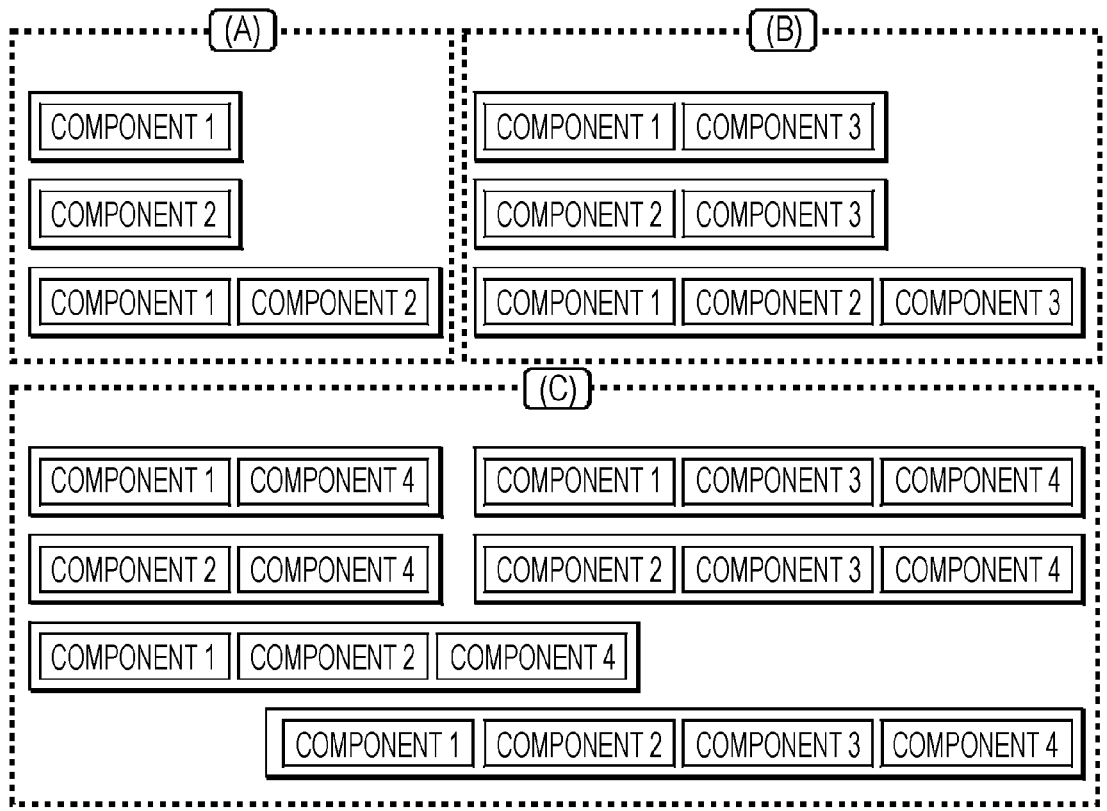

SYSTEM, METHOD, AND PROGRAM FOR GENERATING WEB PAGE

CROSS-REFERENCE TO RELATED APPLICATION

This application claims priority under 35 U.S.C. §119 from Japanese Patent Application No. 2010-214942 filed Sep. 27, 2010 the entire contents of which are incorporated herein by reference.

BACKGROUND OF THE INVENTION

I. Field of the Invention

The present invention relates to a technique for generating a web page that is viewed through an Internet browser. More specifically, the invention relates to a technique for reducing the load time required when viewing a web page.

II. Related Art

Web pages viewed on the Internet have been very commonly used as information sending means, advertizing means, or information gathering means. Recently, there has been an appearance of high-functionality, complicated web pages that not only are intended to be viewed, but also to include many pages and images having dynamic functions using JavaScript(R).

For such complicated web pages including many contents, it takes time to load their top page through a browser. Certain statistics suggest that users exit a page if it takes eight seconds or more to load the page.

Known attempts to reduce the load time of pages include a technology that dynamically causes a client to request necessary files at run time, connects the files on the server, and transfers the connected file. While this technology has an advantage in that optimization is performed individually for each client, it has disadvantages in that a special procedure must be followed in generating a web page, and in that an overhead occurs on the server at run time.

Other known technologies include one that previously connects files to be loaded on a page; however, this technology disadvantageously can perform only rough optimization such as connection of all files or connection of only files related to a particular page.

FIG. 1 shows a state-of-the-art example of a simple process in which multiple files are combined to improve the response time. Specifically, when an HTML file 102 is referring to JavaScript(R) files 104, 106, and 108, the files 104, 106, and 108 are connected to a file 110 using an existing tool. An HTML file 112 refers to the combined file 110. This change improves the response time. Known existing tools having such a function include Dojo custom build and Scriptalizer.

FIG. 2 shows an example of response time improvement where each page is brought into focus. In FIG. 2, a client 1 browses HTML files 202 and 206 sequentially. Files 204 and 208 including JavaScript(R) are sequentially loaded accordingly.

On the other hand, a client 2 is only required to download a file including only necessary function C( ) and function D( ). This is done rapidly.

Since the client 1 was originally intended to browse only the HTML file 202, it is useless that the client 1 has loaded function D( ). Further, the inclusion of function C( ) in both the files 204 and 206 complicates source code management. For example, if function C( ) in the file 204 is changed, function C( ) in file 206 must be changed as well.

FIG. 3 shows an example of response time improvement where an HTML file 302 is brought into focus. In FIG. 3, a client 1 browses HTML files 302 and 306 sequentially. Files 304 and 308 including JavaScript(R) are sequentially loaded accordingly.

On the other hand, a client 2 uses the HTML file 306 loaded and cached by the client 1, but downloads unnecessary function A( ) and B( ) through the HTML file 306.

FIG. 4 shows an example in which accesses are balanced. In this example, an HTML file 402 refers to files 404 and 408, while an HTML file 406 refers to files 408 and 410. The HTML file 402 is accessed frequently, while the HTML file 406 is accessed moderately. Function C( ) must be included in the file 408.

Use of such an approach can balance accesses to the pages to improve the load speed.

However, an actual web application page as shown in FIG. 5 includes many pages, and some of the pages include JavaScript(R). Accordingly, optimization of JavaScript(R) connection in a certain page can result in reductions in performance of other pages.

In an attempt to use a response improvement approach as described above, consideration must be made to an exponential combination of an HTML file, a JavaScript(R) file, and a JavaScript(R) function. Accordingly, such an approach cannot be allowed in terms of computational complexity.

Known related art examples to address the above-mentioned problem include the following ones. Japanese Unexamined Patent Application Publication No. 2001-34527 discloses a method including: holding a frame management sheet where multiple combination patterns of frame placement and contents are described and defined as one file, on a WWW browser as initial display information; reading a frame display definition file; displaying contents described on the frame display definition file; when receiving a content change request from the operator, determining whether there are frames having the same placement, by referring to the frame management sheet; making a request for only contents whose placement is to be changed, to the WWW server; and when receiving changed contents from the WWW server, displaying the changed contents to speed up screen display.

Japanese Patent Application Publication No. 2001-356957 discloses an information display terminal apparatus including: browsing means that displays information on a screen; server means that stores necessary page data to display the information; and cache means that speeds up information display performed by the browsing means by holding part of the stored page data. In updating page data within the server means, an external device directly writes updated data to the cache means.

Japanese Patent Application Publication No. 2002-222165 discloses a method including, in displaying (viewing) an HTML document including multiple images in the display area, preferentially receiving images included in the displayable area (viewing area) over other images regardless of the placement order (appearance order) in the HTML document or the like and displaying the images rapidly so as to speed up the display of the HTML document involving image display and reduce the image display waiting time to increase viewing operability.

Japanese Patent Application Publication No. 2009-110216 discloses a server apparatus that designates a frequently viewed URL in an URL importance table with the URL given higher importance and thus changes the priority in a screen cache priority table in accordance with the importance of the designated URL and that stores drawing data in a cache memory for the drawing data. This related-art example also discloses a client apparatus that, when running a web browser, reads drawing data of a frequently viewed URL with high priority from a cache memory for the drawing data and displays the drawing data.

Japanese Patent Application Publication No. 2010-170182 discloses a data display apparatus including browser function means which is connected to a data accumulation apparatus via a network and which displays data for display accumulated in the data accumulation apparatus. A browser cache determination unit within the browser function means determines whether data for display requested by the user is stored in the browser cache area. If the data is not stored, the data is obtained from an application server within the data accumulation apparatus so as to speed up data display.

While any of the above-mentioned related art examples make some contribution to increasing the speed of page display through a browser, use of these related art examples to improve the response time of complicated web pages including many pages, a script, a function, and an image can cause a combinatorial explosion which is difficult to handle.

SUMMARY OF INVENTION

One aspect of the invention includes a computer-implemented method for reconfiguring a web page using a computer to reduce load time of the web page required when viewing the web page through a browser. The method includes the steps of: extracting dependencies between (i) pages, (ii) files, and (iii) components of the web page stored in a storage unit of the computer, measuring (i) a network delay value, (ii) a transfer efficiency value, and (iii) a component size, estimating load time of a candidate file using information of (i) the network delay value, (ii) the transfer efficiency value, (iii) the dependencies, and (iv) the component size, generating an integer programming problem, where the integer programming problem minimizes an object function representing the load time of the web page by analyzing the web page and generating a (i) dependency, (ii) an inclusion relationship and (iii) a loading relationship in the form of a 0-1 table, solving the integer programming problem using a solver, reconfiguring a library file from a solution obtained by the solver, reconfiguring the web page by replacing a link to the library file of each page with a link to the reorganized library file, and where, at least one step is carried out using a computer device.

Another aspect of the invention includes an article of manufacture tangibly embodying computer readable instructions which, when implemented, cause a computer to carry out the steps of a method for reconfiguring a web page using a computer to reduce load time of the web page required when viewing the web page through a browser, where the method includes the steps of: extracting dependencies between (i) pages, (ii) files, and (iii) components of the web page, measuring (i) a network delay value, (ii) a transfer efficiency value, and (iii) a component size, estimating load time of a candidate file using information of (i) the network delay value, (ii) the transfer efficiency value, (iii) the dependencies, and (iv) the component size, generating an integer programming problem, where the integer programming problem minimizes an object function representing the load time of the web page by analyzing the web page and generating (i) a dependency, (ii) an inclusion relationship, and (iii) a loading relationship in the form of a 0-1 table, solving the integer programming problem using a solver, reconfiguring a library file from a solution obtained by the solver, and reconfiguring the web page by replacing a link to the library file of each page with a link to the reorganized library file.

Yet another aspect of the invention includes a system for reconfiguring a web page using a computer to reduce load time of the web page required when viewing the web page through a browser. The system includes: a storage unit that stores (i) pages, (ii) files, and (iii) components of the web page, a dependency extraction module that extracts dependencies between (i) pages, (ii) files, and (iii) components of the web page stored in the storage unit, a measurement module that measures (i) a network delay value, (ii) a transfer efficiency value, and (iii) a component size, an estimated load time calculation module that estimates load time of a candidate file using information of (i) the network delay value, (ii) the transfer efficiency value, (iii) the dependencies, and (iv) the component size, an integer programming problem generation module that generates an integer programming problem, where the integer programming problem minimizes an object function representing the load time of the web page by analyzing the web page and generating a (i) dependency, (ii) an inclusion relationship, and (iii) a loading relationship in the form of a 0-1 table, a solver that has the function of solving the integer programming problem, a reconfiguration module that reorganizes a library file from a solution obtained by the solver, and a reconfiguration module that reorganizes the web page by replacing a link to the library file of each page with a link to the reorganized library file.

BRIEF DESCRIPTION OF THE DRAWINGS

FIG. 12(a) is a diagram illustrating an aspect where the same types of components are concatenated by using a combination of dependencies to reduce the number of components.

FIG. 12(b) is a diagram illustrating an aspect where the same types of components are concatenated by using a combination of dependencies to reduce the number of components.

FIG. 14 is a diagram illustrating an aspect where a candidate search file is generated from a value representing whether a page transition, dependency, or speculative load is allowed.

DETAILED DESCRIPTION OF THE PREFERRED EMBODIMENTS

Figure 1:
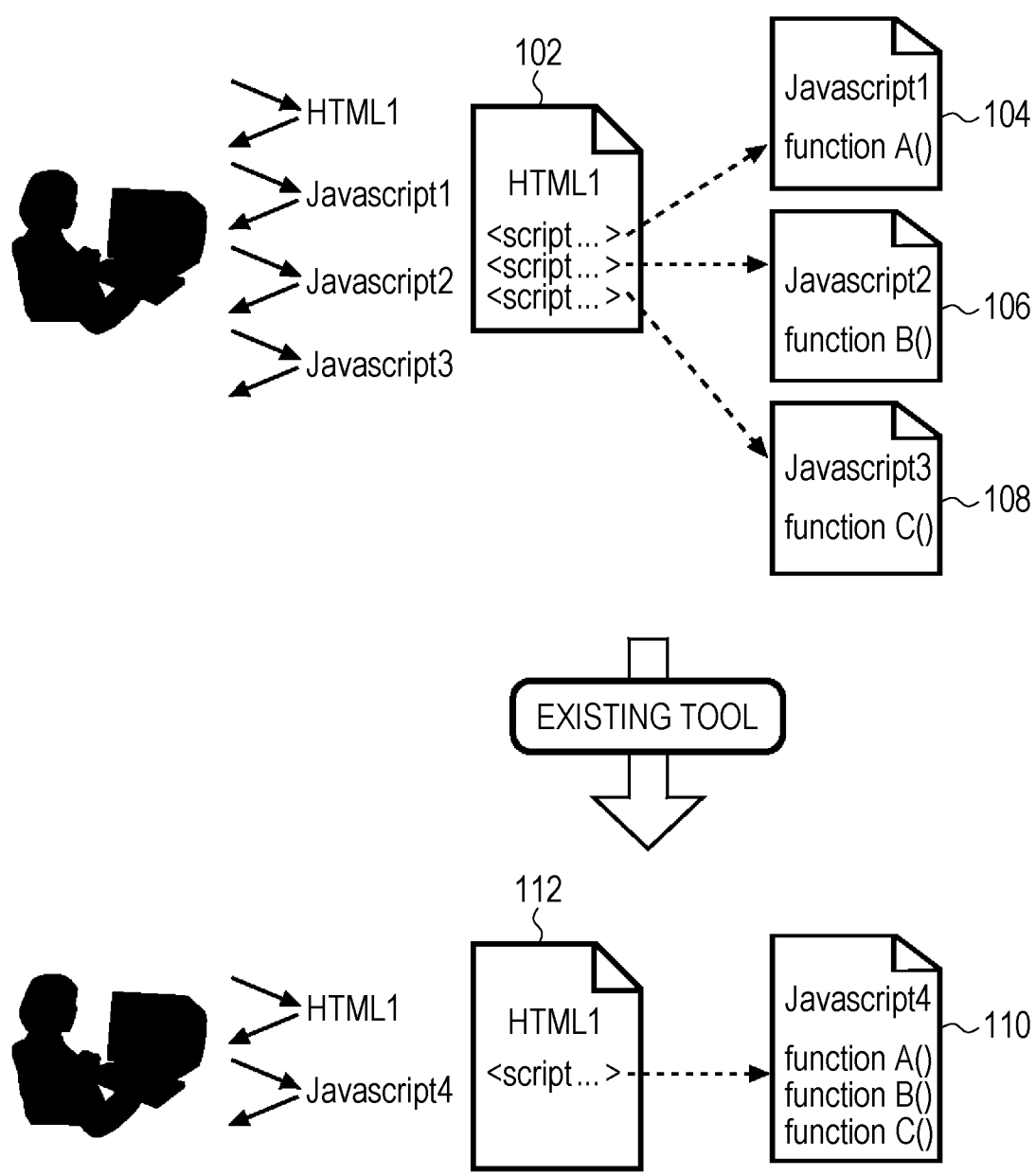
FIG. 1 is a drawing illustrating an example of response time improvement according to the related art.
Figure 2:
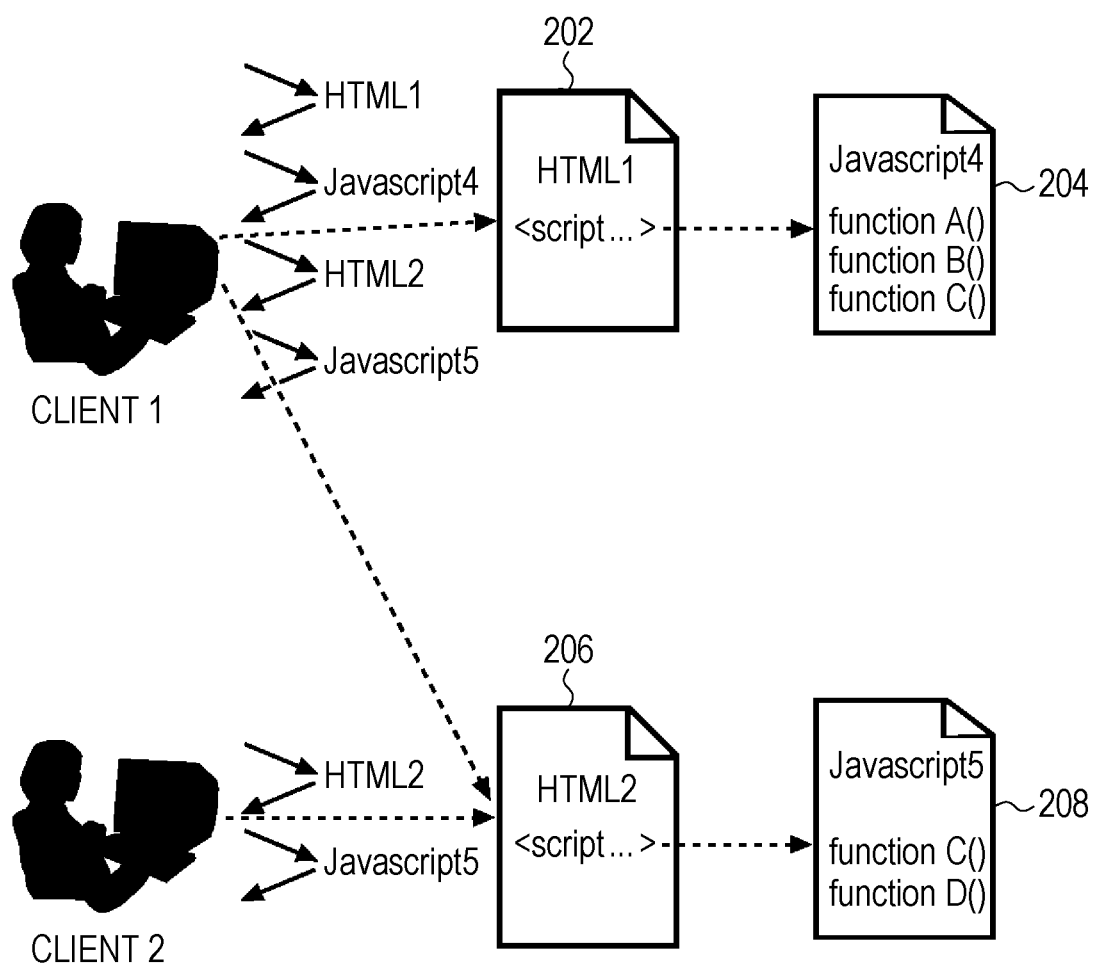
FIG. 2 is a drawing illustrating an example of a possible response time improvement technology.
Figure 3:
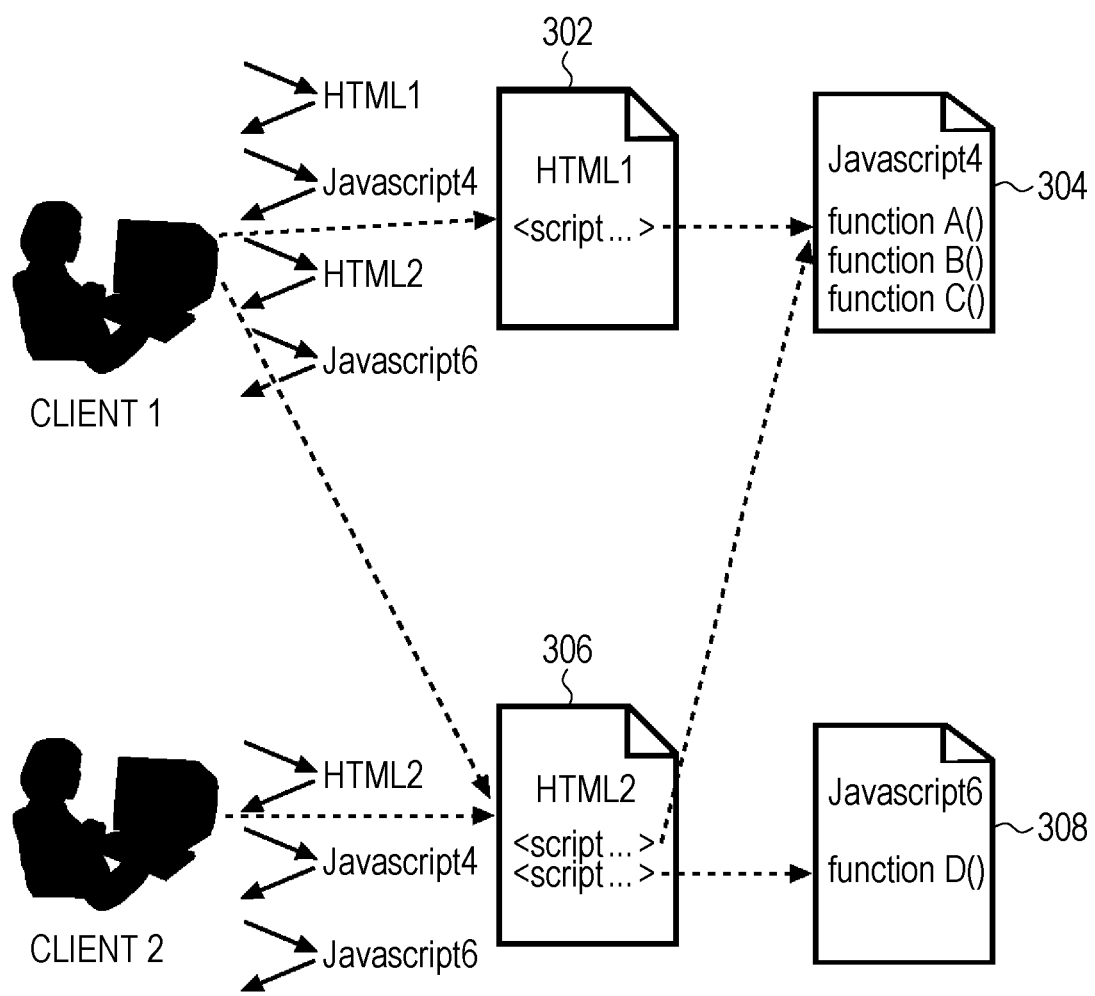
FIG. 3 is a drawing illustrating an example of a possible response time improvement technology.
Figure 4:
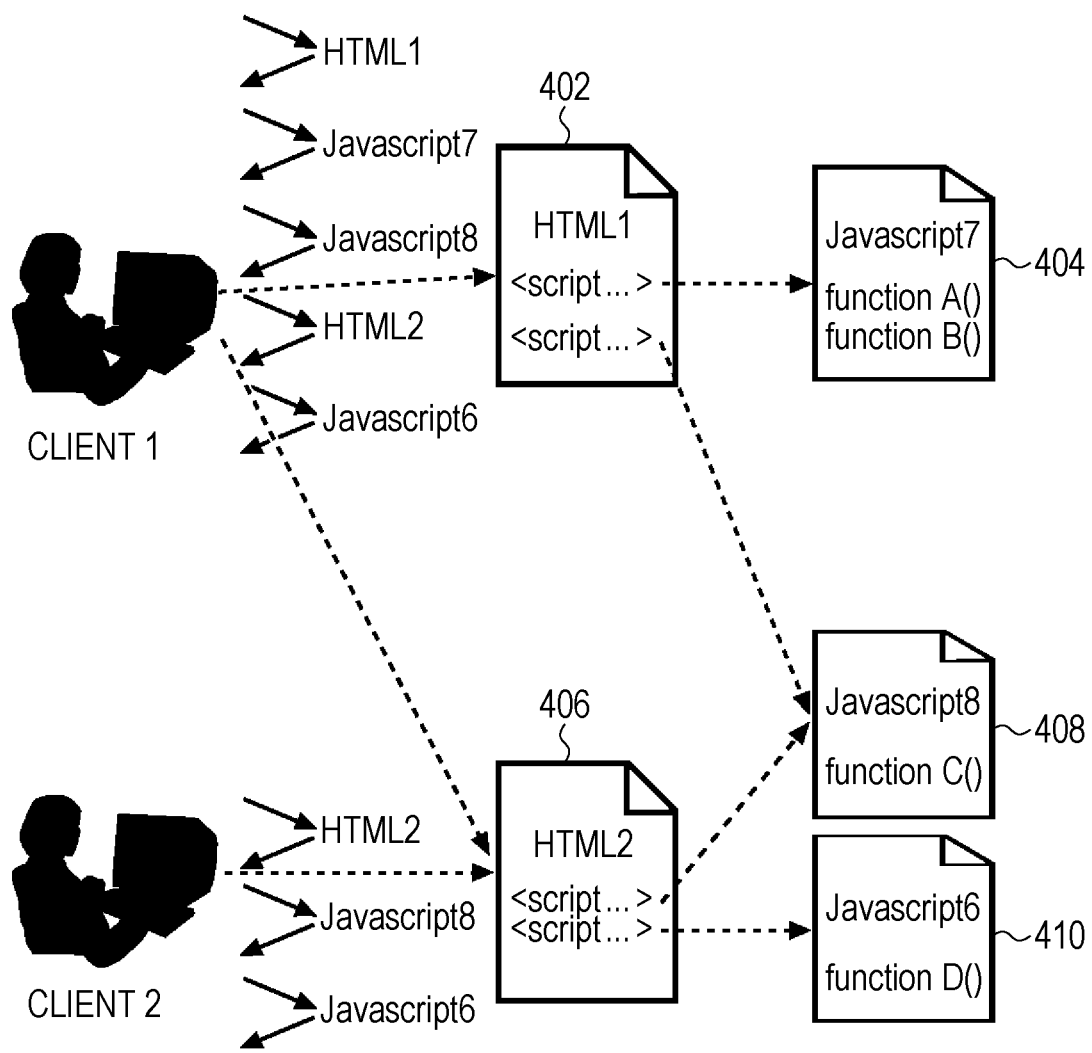
FIG. 4 is a drawing illustrating an example of a possible response time improvement technology.
Figure 5:
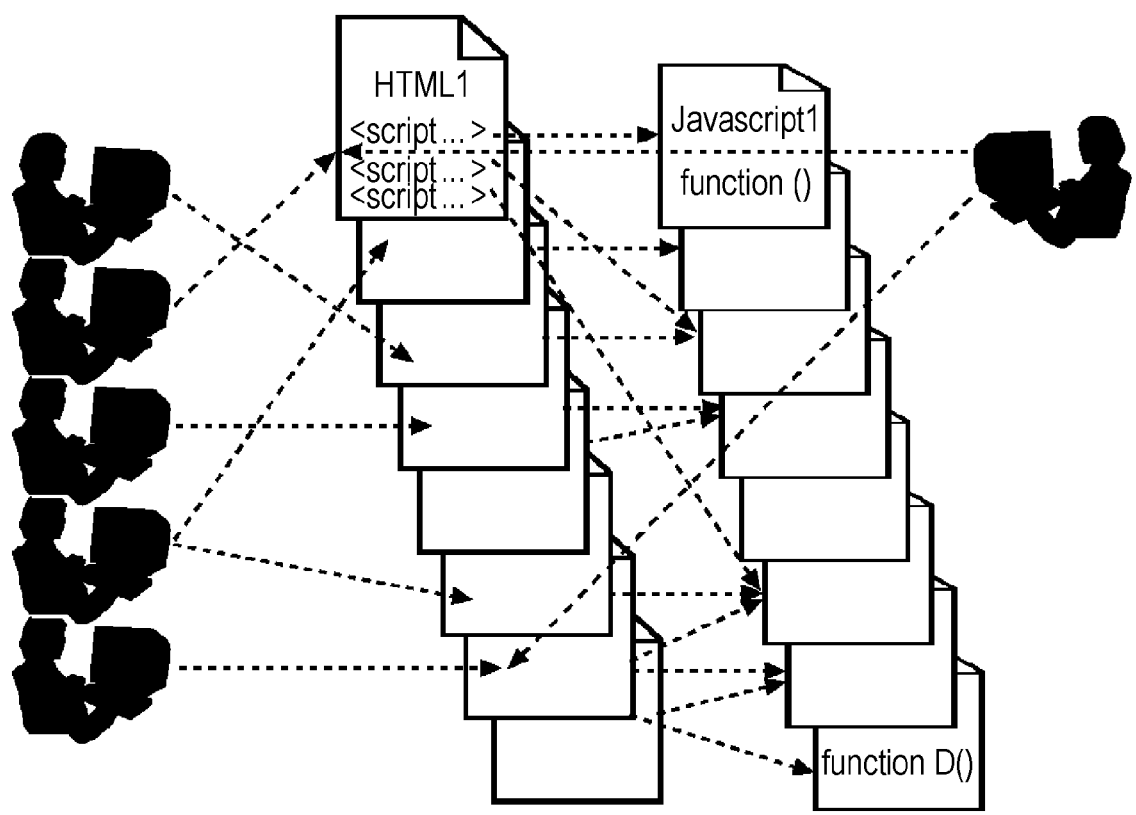
FIG. 5 is a drawing schematically illustrating the complexity of an actual web application.

It is an object of the present invention to provide a technique to improve response time which is applicable to complicated web pages including many pages, a script, a function, and an image.

Considering the relationships between a great number of pages and a great number of files, the present invention provides a technique that reorganizes a web page so that the response time required when viewing the web page is improved.

A page used herein typically refers to a web unit accessed by a client and generally depends on some components. A page includes some files in order to use components on which the page depends. A component refers to a web content unit and is, for example, a JavaScript(R) function, a collection of JavaScript(R) code, a collection of css lines, an image, or the like. A file typically refers to a JavaScript(R) file, a css file, a css sprite (a technology that stores multiple images in one image and cuts an area from the one image and displays the resulting image on an HTML), or the like.

In a processing program according to the present invention, first, the dependencies between pages and components of a web page whose response time is desired to be improved are extracted.

The next step is to measure a network delay value, a transfer efficiency value, page sizes, and component sizes. In principle, this process is also automatically performed by the processing program.

The next step is to set page transition patterns and their priority and the upper limit of the response time of each page. In principle, this process is performed by an operator who performs a web page response time improvement process.

The next step is to concatenate the same type of components using a combination of the extracted dependencies in accordance with the processing program. At this time, considering the concatenated components as a new component, information such as the component size is updated.

The next step is to generate a candidate search file in accordance with the processing program. Subsequently, the estimated load time of the generated candidate file is calculated in accordance with the processing program.

The next step is to generate an integer programming problem in accordance with the processing program. Specifically, the web page is analyzed, and a dependency (depend) and an inclusion relationship (include) are generated in the form of a 0-1 table. Further, a loading relationship (x) is generated in the form of a 0-1 table.

At that time, a constraint condition "some files read by a page i must provide the page i with all components on which the page i depends" is imposed on the integer programming problem. The integer programming problem is then formulated so that the sum of the download times of the pages and files is minimized, and a solver is allowed to solve the integer programming problem.

A library file is reorganized from the obtained solution in accordance with the processing program. A link to the library file of each page is rewritten into a link to the reorganized library file.

According to the present invention, a web page response time improvement process results in an integer programming problem. Thus, even a complicated web page can be reorganized with reasonable computational complexity so that the response time is improved.

An embodiment of the present invention will be described with reference to the accompanying drawings. It should be understood that this embodiment is intended to describe a preferred aspect of the present invention and is not intended to limit the scope of the invention. Through the drawings below, same reference signs designate same components unless otherwise specified.

Figure 6:
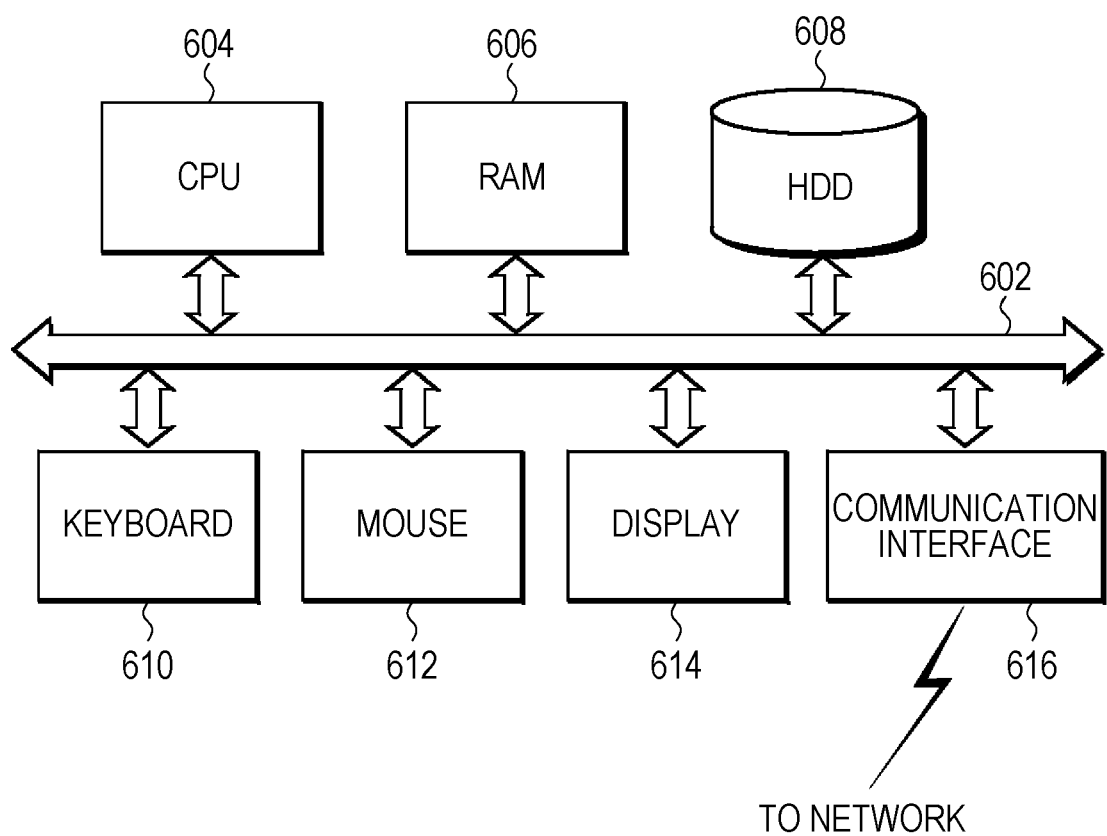
FIG. 6 is a block diagram illustrating an example of hardware according to an embodiment of the present invention.

FIG. 6 shows a block diagram of computer hardware for realizing a system configuration and processes according to this embodiment. In FIG. 6, a CPU 604, a main memory (RAM) 606, a hard disk drive (HDD) 608, a keyboard 160, a mouse 612, and a display 614 are connected to a system bus 602. The CPU604 is preferably based on a 32-bit or 64-bit architecture and can be, for example, Pentium™ 4 or Core™ 2 DUO available from Intel Corporation or Athlon™ available from Advanced Micro Devices, Inc. The main memory 606 has a capacity preferably not less than 1 GB, more preferably not less than 2 GB.

The hard disk drive 608 has an operating system installed thereon. The operating system can be of any type conforming to the CPU 604, such as Linux™, Windows™ 7, Windows XP™, or Windows™ 2003 server available from Microsoft Corporation or Mac OS™ available from Apple Inc.

Also installed on the hard disk drive 608 is a program for causing the system to operate as a web server, such as Apache. This program is loaded into the main memory 606 when the system is started.

Further, the hard disk drive 608 is storing a web page which is desired to be viewed through a browser with an improved response time, and the contents of the web page. A web page used herein is typically a web unit accessed by a client and generally depends on some components. A web page also includes some files in order to use the components on which it depends. A component is a unit of web content and refers to, for example, a JavaScript(R) function, a collection of JavaScript(R) code, a collection of css lines, an image, and the like. A file typically refers to a JavaScript(R) file, css file, css sprite, or the like.

The hard disk drive 608 also includes a web page dependency extraction module, a component concatenation module, a file search module, an integer programming problem generation module, and an integer programming solver. These modules are loaded into the main memory 606 by the operating system as necessary and executed by the CPU 604 or the like. These modules will be described in more detail with reference to FIG. 7.

The keyboard 610 and the mouse 612 are used to operate graphic objects displayed on the display 614, such as icons, task bars, and windows, in accordance with a graphic user interface provided by the operating system.

The display 614 is preferably a 32-bit true color LCD monitor with a resolution of 1024×768 or more, but not limited thereto.

The communication interface 616 is preferably connected to a network in accordance with an Ethernet(R) protocol. Using a function provided by Apache through a client computer (not shown), the communication interface 616 receives a process request in accordance with a communication protocol such as TCP/IP or returns a process result to a client computer (not shown).

Figure 7:
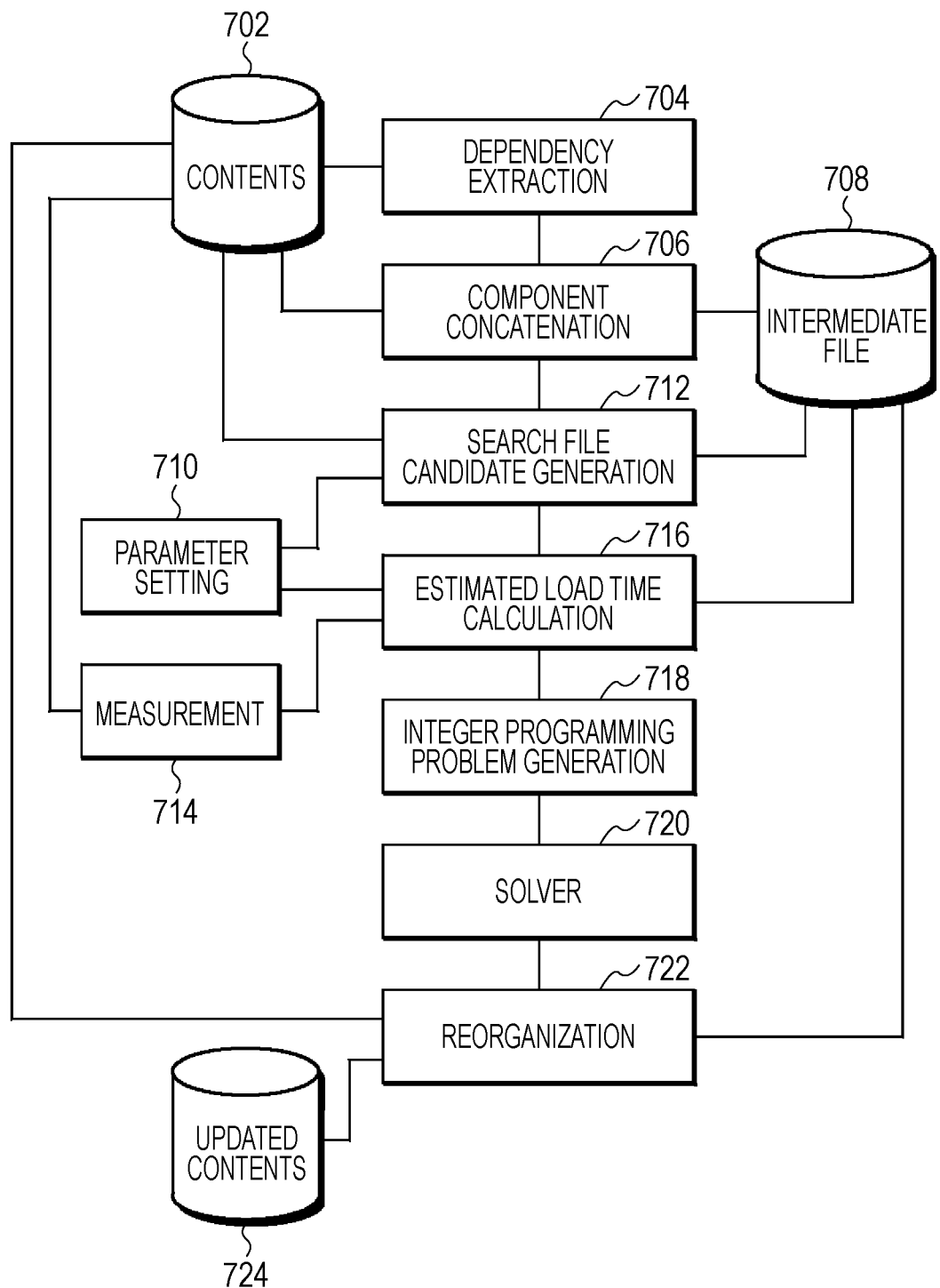
FIG. 7 is a diagram illustrating functional logic blocks according to this embodiment.

Next, referring to FIG. 7, the functions of files and function modules stored in the hard disk drive 608 will be described in relation to the present invention. Contents 702 include the contents of the web page whose response time is desired to be improved, that is, the above-mentioned pages, files, and components.

A dependency extraction module 704 reads pages and files from the contents 702 and extracts the dependency therebetween.

Dependency used herein refers to a relationship in which the contents of a file are used in a page through a link such as <a href="xyz/abc.html"></a> or a call such as <script src="xyz/abc.js" type="text/javascript"></script>, <img src="xyz/abc.gif">. Assuming that the components are Javascript functions and the files are Javascript files, a sample HTML file to be described later depends on, for example, a component function012(a,b,c) through a file test03.js.

According to information obtained from the dependency extraction module 704, a component concatenation module 706 concatenates components included in the contents 702 and writes the concatenated component to the hard disk drive 608 as an intermediate file 708 so as to use it later. The component concatenation module will be described later.

A parameter setting module 710 has the function of showing a panel, preferably on the display 614, to the operator so that the operator can set page transition patterns and their priority and the upper limit of the response time of each pattern.

A candidate search file generation module 712 generates a candidate search file while referring to the contents 702 and the intermediate file 708, as well as the information set by the parameter setting module 710 as necessary. It then writes the generated candidate search file to the hard disk drive 608 as an intermediate file 708 in order to use it later. A search file will also be described later.

A measurement module 714 measures a network delay value, a transfer efficiency value, a page size, and a component size while using the communication interface 616 as necessary.

An estimated load time calculation module 716 calculates an estimated load time using measurements obtained by the measurement module 714 while referring to the settings made by the parameter setting module 710 in some cases. The estimated load time calculated can be stored in the main memory 606 or temporarily stored in the hard disk drive 608.

An integer programming problem generation module 718 generates an equation representing an integer programming problem on the basis of the output of the estimated load time calculation module 716. The integer programming problem equation generated will be described specifically.

A solver 720 solves the integer programming problem equation generated by the integer programming problem generation module 718.

Using the output of the solver 720, a reconfiguration module 722 generates updated contents 724 on the basis of the original contents 702 and the intermediate file 708. The updated contents 724 allow the web page to be browsed with an optimized load time through a browser of a client computer, compared to the contents 702.

Figure 8A:
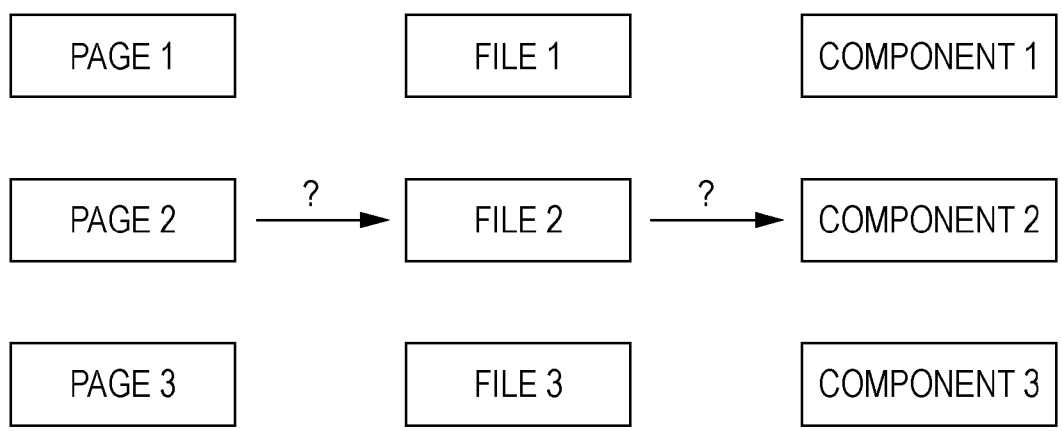
FIG. 8(a) is a drawing illustrating the connections between pages, files, and components as an integer programming problem.

Next, some features of the present invention will be described. A first feature is to convert an integer programming problem into an optimization problem and allow an optimization problem solver to solve the optimization problem. Where an existing tool is used, a component to which any page should be connected is not clear for a developer, as shown in FIG. 8(a). Accordingly, the developer attempts to concatenate all components to one page.

Figure 8B:
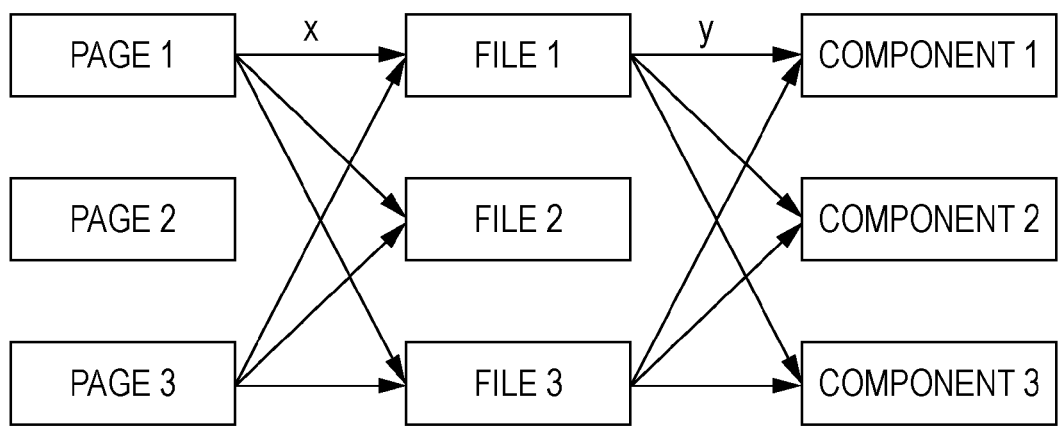
FIG. 8(b) is a drawing illustrating the connections between pages, files, and components as an integer programming problem.

On the other hand, the first feature of the present invention is shown in FIG. 8(b). That is, as shown, a model or equation is generated in all selectable portions using optimization variables (x,y), and whether a page or file should be read is set by substituting 0-1 into these variables. Further, the time required for a page transition is defined using a cost function which varies depending on x,y, and x,y are derived so that the function is minimized.

Figure 9A:
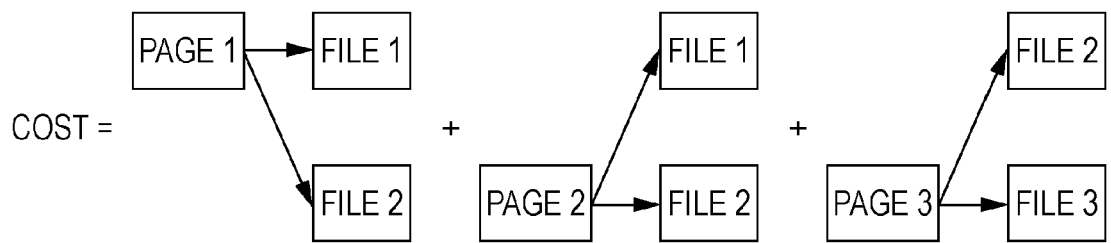
FIG. 9(a) is a diagram illustrating a browser cache effect.
Figure 9B:
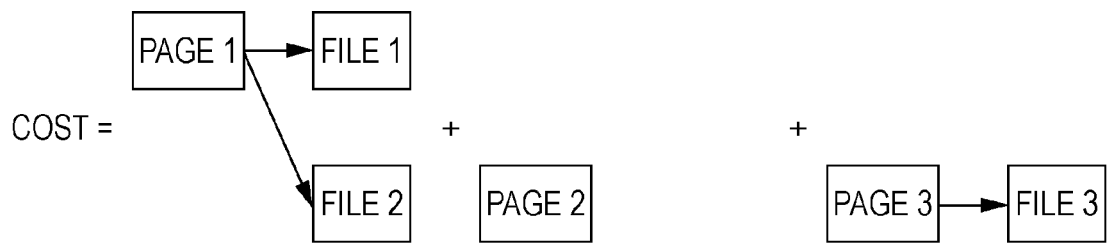
FIG. 9(b) is a diagram illustrating a browser cache effect.
Figure 10:
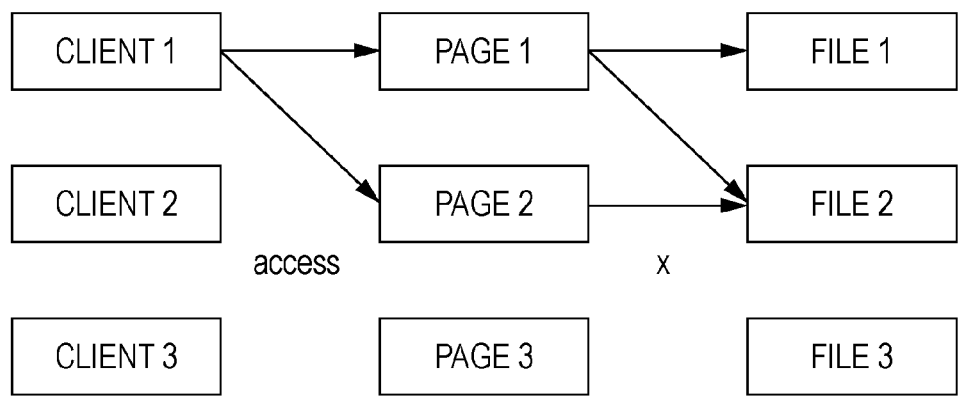
FIG. 10 is a diagram illustrating the connections between clients, pages, and files.

A second feature is to introduce a browser cache effect. If no measure is taken, the cost of the same file is added to the cost function (the sum of the response times) multiple times, as shown in FIG. 9(a). A measure in this regard is one shown in FIG. 9(a). That is, the cost of the same file is added only once owing to a browser cache effect. This can avoid the cost from being added repeatedly.

A problem with this method is that an OR calculation is required. However, an OR calculation cannot be represented in a 0-1 integer programming problem. To solve this problem, typical clients are introduced, a set of continuously accessed pages is defined, and a variable Y is defined as follows:
Y=1: a file is read once or more during a page transition.
Y=0: a file is not read even once during a page transition.

For the variable Y to function as an OR, the following two constraint equations are introduced.

$$y_{km} \geq \frac{1}{L}\sum_{l=1}^{L} \text{access}(k,1) \cdot x_{lm} (k=1,\ldots,K, m=1,\ldots,M) \quad [\text{Formula 1}]$$

$$y_{km} \geq \frac{1}{L}\sum_{l=1}^{L} \text{access}(k,1) \cdot x_{lm} + 1 - \frac{1}{L} (k=1,\ldots,K, m=1,\ldots,M)$$

where K represents the number of clients; L represents the number of pages; M represents the number of files; and access(k,l) is 1 when a client k accesses page l and is otherwise 0.

In the upper one of the above-mentioned equations, Y must be 1 or more if 1 is present in access( )* x. An example is as follows:

$$Y(c1, \text{file2}) \geq 1/3(\text{access}(c1, \text{page1}) * x(\text{page1}, \text{file2}) +$$
$$\text{access}(c1, \text{page2}) * x(\text{page2}, \text{file2}) +$$
$$\text{access}(c1, \text{page3}) * x(\text{page3}, \text{file2})) \geq 1/3(1+1+0) \geq 2/3$$

That is, Y is a 0-1 variable and therefore must be 1.

In the lower equation, on the other hand, Y can be any of 0 and 1 (as in the upper equation) when all are 0. Here, Y is limited to 0.

$$Y(c1, \text{file3}) \leq$$
$$1/3(\text{access}(c1, \text{page1}) * x(\text{page1}, \text{file3}) + \text{access}(c1, \text{page2}) * x(page2,$$
$$\text{file3}) + \text{access}(c1, \text{page3}) * x(\text{page3}, \text{file3})) +$$
$$1 - 1/3 \leq 1/3(0+0+0) + 2/3 \leq 2/3$$

That is, Y is a 0-1 variable and therefore must be 0.

Figure 11A:
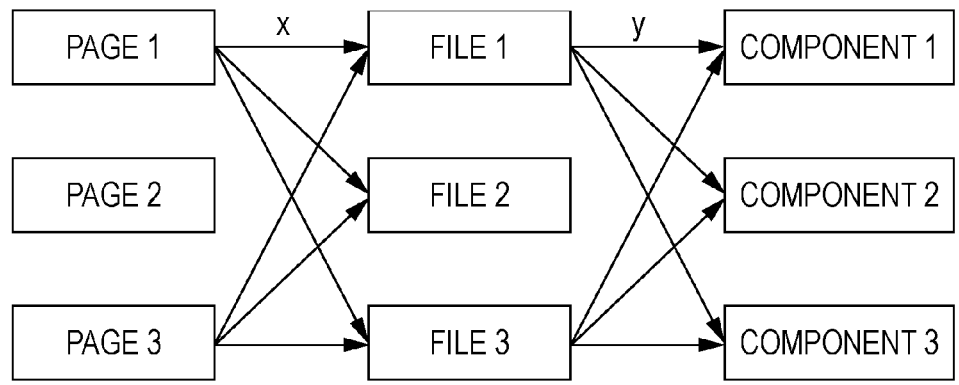
FIG. 11(a) is a diagram illustrating conversion from quadratic programming to linear programming.

A third feature is to simplify the integer programming problem, which is a quadratic programming problem, into a linear integer programming problem. That is, when an integer programming problem is merely generated, the cost function takes a form of the sum of constant*X*Y where X indicates whether the page includes a file and Y indicates whether the file includes a component. Accordingly, the integer programming problem is a quadratic programming problem. This aspect is shown in FIG. 11(a). In this case, the calculation time is increased.

Figure 11B:
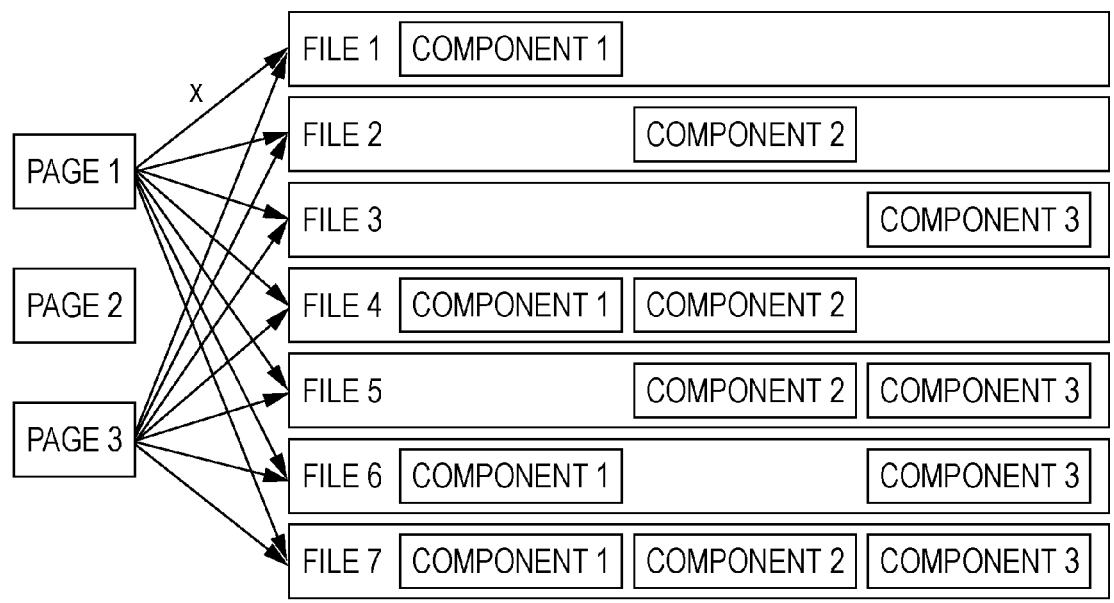
FIG. 11(b) is a diagram illustrating conversion from quadratic programming to linear programming.

For this reason, include from a file to a component is used as a constant and, instead, files representing all combinations are prepared, as shown in FIG. 11(b). If the number of components is N, the number of files is $2^N-1$. Thus, the problem can be represented by only X representing whether the page includes a file.

Specifically, files are connected as follows. Here it is assumed that the component is a Javascript function and the file is a Javascript file.

```
<html>
<head>
    <script src="test01.js" type="text/javascript"></script>
    <script src="test02.js" type="text/javascript"></script>
</head>
<body>
<script src="test03.js" type="text/javascript">
    function012(a, b, c);
    </script>
</body>
</html>
        test01.js is assumed to be:
function function011(a, b, c) {
....
}
function function012(a, b, c) {
....
}
        test02.js is assumed to be:
function function021(a, b, c) {
....
}
        test03.js is assumed to be:
function function031(a, b, c) {
....
}
```

First, test01.js, test02.js, and test03.js are merged to generate opt01.js below.

```
function function011(a, b, c) {
....
}
function function012(a, b, c) {
....
}
function function021(a, b, c) {
....
}
function function031(a, b, c) {
....
}
```

Then, using opt01.js, the HTML file is optimized as follows.

```
<html>
<head>
    <script src="opt01.js" type="text/javascript"></script>
    <script src="opt01.js" type="text/javascript"></script>
</head>
<body>
<script src="opt01.js" type="text/javascript">
    function012(a, b, c);
</script>
</body>
</html>
```

A fourth feature is to concatenate the same type of components using a combination of dependencies to reduce the number of components. That is, a reduction in the number of components can reduce the number of search files. What is used at this time is a finding that components called from the same page are always finally incorporated into the same file regardless of how the optimization result is. Using this finding, components called from the same page as shown in FIG. 12(a) are concatenated and redefined as a concatenated component as shown in FIG. 12(b).

A fifth feature is to generate a candidate search file from a value representing whether a page transition, dependency, or speculative load is allowed.

To put it simply, $2^N-1$ (N is the number of components) candidate files are generated. Accordingly, a reduction in the number of candidate search files reduces the calculation time.

Conceivably, combinations are classified as follows. That is:

(A) For X number of components used by a page i, $2^X-1$ combinations are considered. All component combinations required by the page are prepared.

(B) Y number of components not used by the page i but used by another page included in the same page transition are added, and $2^{(X+Y)}-1$ combinations are considered. All component combinations required to perform a speculative download with respect to the page i are prepared. A speculative download with respect to the page i refers to that the page i previously loads components required by another page but not required by the page i and stores the components in the browser cache.

Figure 13:
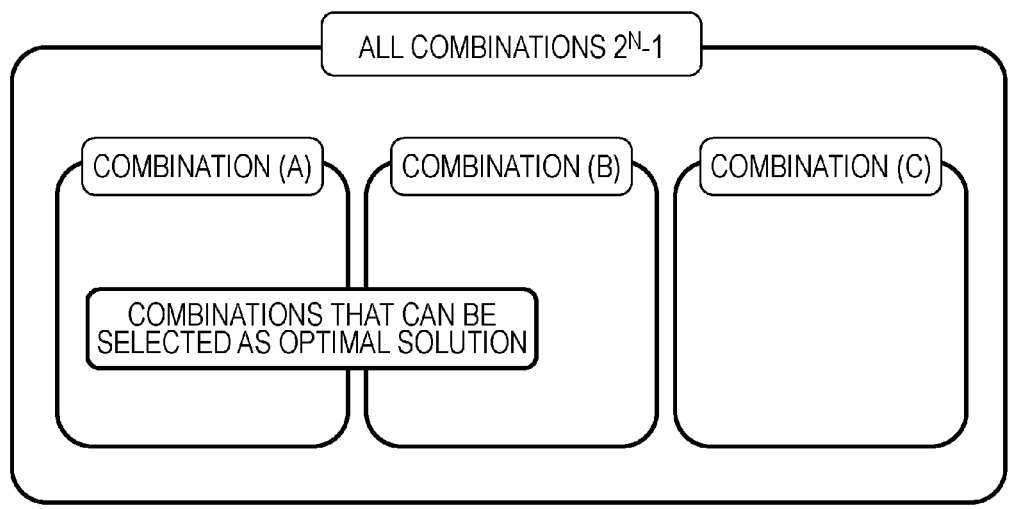
FIG. 13 is a diagram illustrating an aspect where a candidate search file is generated from a value representing whether a page transition, dependency, or speculative load is allowed.

(C) A combination of components used only in any one of two page transitions cannot become an optimal solution. This is schematically shown in FIG. 13. FIG. 14 is a diagram showing combinations of components when attention is paid to the page 1.

A sixth feature is to give priority to a particular transition pattern using a typical client and its importance. This feature is based on the need to selectively speed up a page or page transition having many users in proportion to the number of users or the need to selectively speed up a page or page transition important in terms of business.

Figure 15:
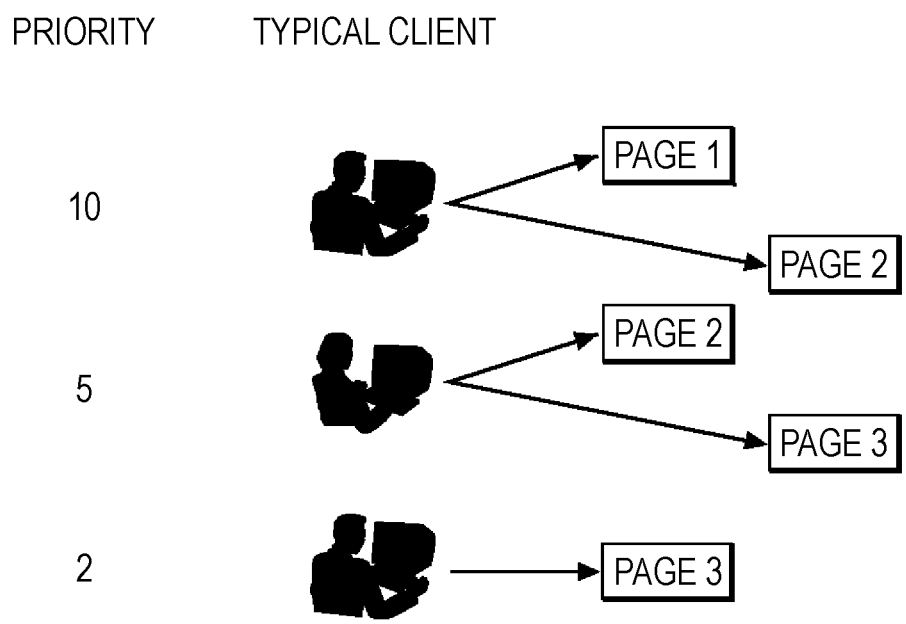
FIG. 15 is a drawing illustrating prioritization of a particular transition pattern using typical clients and their priority.

A typical page transition and its importance are defined using the following method. First, web contents are placed, actual clients are allowed to use the web contents, and access logs are analyzed to obtain the number of users. The importance is determined according to the number of users obtained. Further, the developer or business owner defines a typical page transition. Furthermore, an addition where the cost of a page transition is weighted based on importance is added to the cost function. An example of such prioritization is shown in FIG. 15. According to this drawing, the cost is calculated as follows: Cost=10* cost (page 1)+10* cost (page 2)+5* cost (page 2)+5* cost (page 3)+2* cost (page 3)

A seventh feature is to set the worst allowable response time for each page. It is useful to meet the need to avoid clients from waiting for particular seconds or more when they browse a page important in terms of business. A device for meeting such a need will be described. The device is represented by an equation as described below.

$$d + r \cdot \text{page\_size}_l + \sum_{m=1}^{M} \text{file\_cost}_m \cdot x_{lm} \leq T_1 (l = 1, \ldots, L) \quad \text{[Formula 2]}$$

where L represents the number of pages and M represents the number of pages.

Use of this equation allows confining the time taken when the page is accessed without a browser cache, to a specified value T or less. This process is also done on a page for which the worst allowable response time is desired to be set.

As another device, the allowable response time can be set for all pages included in all page transitions. However, this device requires reformulation from the fundamental part, which can extend the run time. For this reason, this device is used according to the circumstances.

An eighth feature is to reduce the number of candidate files. Generally, the classification of a problem is changed according to the value an optimization variable x can take. That is, if x is a 0-1 variable, the problem is a 0-1 integer programming problem; if x is a real variable, the problem is a linear programming problem.

On the other hand, in an integer programming problem according to this embodiment, the number of variables (candidate files) is increased exponentially relative to the number of components, N. Accordingly, where N is large, a device for reducing the number of candidate files is needed. In this feature, if applicable, the integer programming problem is repeatedly solved as a linear programming problem using some candidate files. This leads to selection of a candidate file that is estimated to be most probably used as an optimal solution in a 0-1 integer programming problem.

First, the integer programming problem according to this embodiment is formulated as follows. That is, the following equation is solved as an objective function under the constraints below by a solver.

$$\sum_{k=1}^{K} \sum_{m=1}^{M} p_k \cdot y_{km} \cdot \text{file\_cost}_m \quad \text{[Formula 3]}$$

where $p_k$ represents the priority of a $page_k$.

$$\sum_{m=1}^{M} x_{lm} \cdot \text{include}(m, n) \geq 1 (\forall \text{ depend}(1, n) = 1) \quad \text{[Formula 4]}$$

$$y_{km} \geq \frac{1}{L} \sum_{l=1}^{L} \text{access}(k, 1) \cdot x_{lm} (k = 1, \ldots, K, m = 1, \ldots, M)$$

$$y_{km} \geq \frac{1}{L} \sum_{l=1}^{L} \text{access}(k, 1) \cdot x_{lm} +$$

$$1 - \frac{1}{L} (k = 1, \ldots, K, m = 1, \ldots, M)$$

$$x_{lm} \in (0, 1)(l = 1, \ldots, L, m = 1, \ldots, M)$$

$$y_{km} \in (0, 1)(k = 1, \ldots, K, m = 1, \ldots, M)$$

Figure 16:
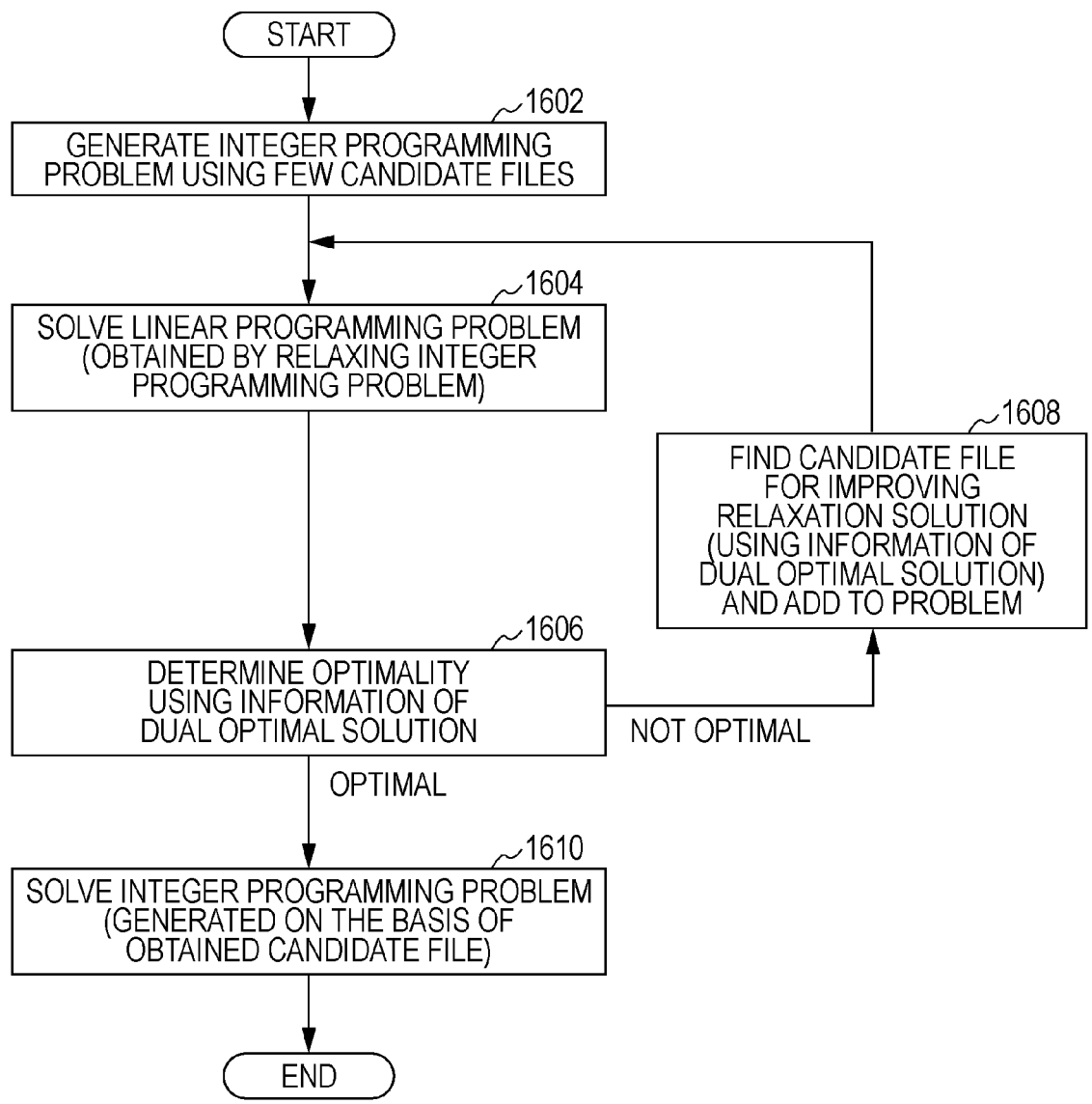
FIG. 16 is a flowchart illustrating the process of solving a linear programming problem obtained by relaxing an integer programming problem.

The algorithm will be described more specifically with reference to the flowchart of FIG. 16. First, in step 1602, the integer programming problem generation module 718 generates an integer programming problem using a few candidate files. The integer programming problem is passed to the solver 720, which then in step 1604 relaxes the 0,1 constraint of the passed integer programming problem and solves the problem as a linear programming problem.

Here, a suffix set of intermediate variable constraints is defined as $N_l:=\{n|\text{depend}(l,n)=1\}$. Optimality is determined using information of a dual optimal solution. That is, the dual variable of the intermediate variable constraint is defined as $\beta_{ln}$ (provided that only a pair of $n \in N_l$ is prepared). Defining the dual optimal solution as $\beta_{ln}$, each $l \in \{1, \ldots, L\}$ is checked in $N'_l := \{n | \beta^*_{ln} - q_l \cdot r \cdot \text{component\_size}(n) > 0\}$ using the following formula.

$$\sum_{n \in N_{1r}} \{\beta^*_{ln} - q_1 \cdot r \cdot \text{component\_size}(n)\} > q_1 d \quad \text{[Formula 5]}$$

Here, $q_l$ is obtained as follows.

$$q_1 = \frac{1}{L} \cdot \sum_{\text{Pattern}_k \text{ including } k \in \text{page 1}} p_k \quad \text{[Formula 6]}$$

A network delay time d has a value of approximately 10 to 50 ms in Japan. This is the time taken before a packet completes a round trip between a client and the server. A transfer efficiency value r is (the reciprocal of the bandwidth)×8. If the bandwidth is 1 Mbps, r=8/(1M).

"Pattern$_k$ including k ∈ page l" means that all ks where access$_{kl}$=1 are retrieved from page l and the ks are sequentially selected and subjected to Σ. $p_k$ represents priority as shown in FIG. 15.

If even one of l ∈ {1, . . . , L} is true in Formula 5 in step 1606, the solution is determined not to be optimal. The integer programming problem generation module 718 then proceeds to step 1608 and adds N to the problem as a candidate file for improving the relaxation solution. The integer programming problem generation module 718 then returns to step 1604 to solve the linear programming problem again.

In contrast, if this equation is determined to be false with respect to all of l ∈ {1, . . . , L} in step 1606, the solution is determined to be optimal and the process proceeds to step 1610. The solver 720 solves an integer programming problem generated on the basis of an obtained candidate file and completes the process.

Figure 17:
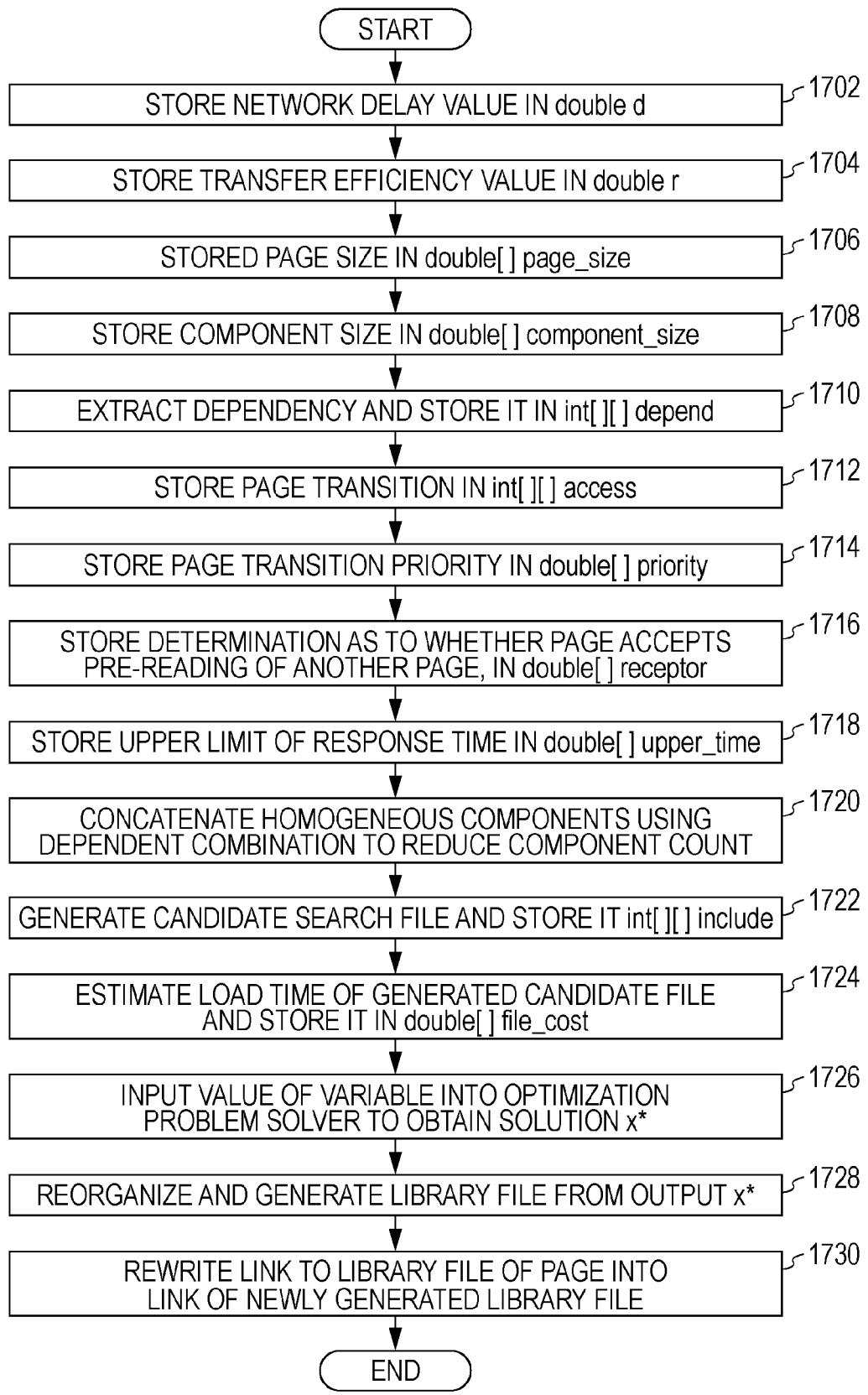
FIG. 17 is a flowchart schematically illustrating the entire process according to this embodiment.

Next, the entire process according to this embodiment will be described with reference to the flowcharts of FIGS. 17 and later. In step 1702, the measurement module 714 stores a network delay value in double d.

In step 1704, the measurement module 714 stores a transfer efficiency value in double r.

In step 1706, the measurement module 714 stores a page size in double[ ] page_size.

In step 1708, the measurement module 714 stores a component size in double[ ] component_size.

In step 1710, the dependency extraction module 704 extracts a dependency and stores it in int[][] depend.

In step 1712, the dependency extraction module 704 stores a page transition in int[ ][ ] access.

In step 1714, the dependency extraction module 704 stores the priority of a page transition in double[ ] priority.

In step 1716, the dependency extraction module 704 stores, in double[ ] receptor, a determination as to whether a page accepts pre-reading of another page.

In step 1718, the parameter setting module 710 stores the upper limit of the response time in double[ ] upper_time.

In step 1720, the component concatenation module 706 concatenates the same type of components using a combination of dependencies to reduce the number of components.

In step 1722, the candidate search file generation module 712 generates a candidate search file and stores it in int[ ][ ] include.

In step 1724, the estimated load time calculation module 716 estimates the load time of the generated candidate file and stores it in double[ ] file_cost.

In step 1726, the integer programming problem generation module 718 inputs the value of a variable into an optimization problem solver to obtain a solution x*.

In step 1728, the reconfiguration module 722 reorganizes a library file from the output x*.

In step 1730, the reconfiguration module 722 rewrites a link to the library file of each page into a link to the reorganized library file.

Figure 18:
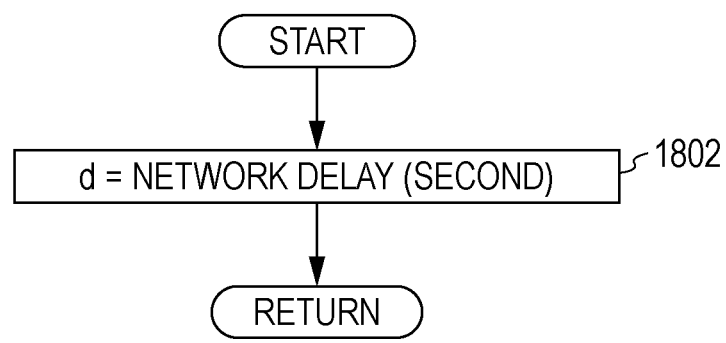
FIG. 18 is a flowchart illustrating a network delay value storage process.

Next, referring to the flowchart of FIG. 18, the process in which the measurement module 714 stores a network delay value in double d will be described. In step 1802, the measurement module 714 obtains a network delay value (seconds) while accessing the communication interface 616 as necessary and stores the obtained value in a variable d.

Figure 19:
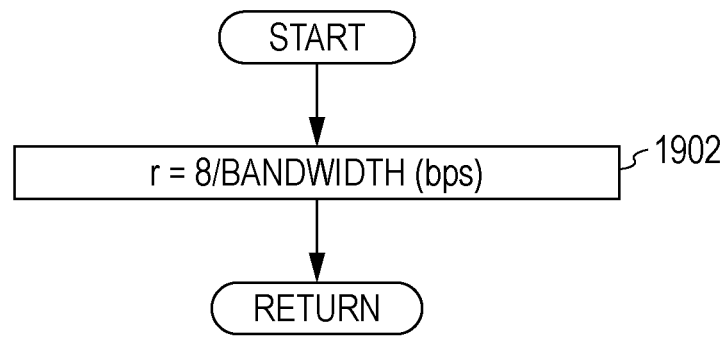
FIG. 19 is a flowchart illustrating a transfer efficiency value storage process.

Next, referring to the flowchart of FIG. 19, the process in which the measurement module 714 stores a transfer efficiency value in double r will be described. In step 1902, the measurement module 714 obtains a bandwidth value (bps) while accessing the communication interface 616 as necessary, divides 8 by the obtained value, and stores the division result in a variable r.

Figure 20:
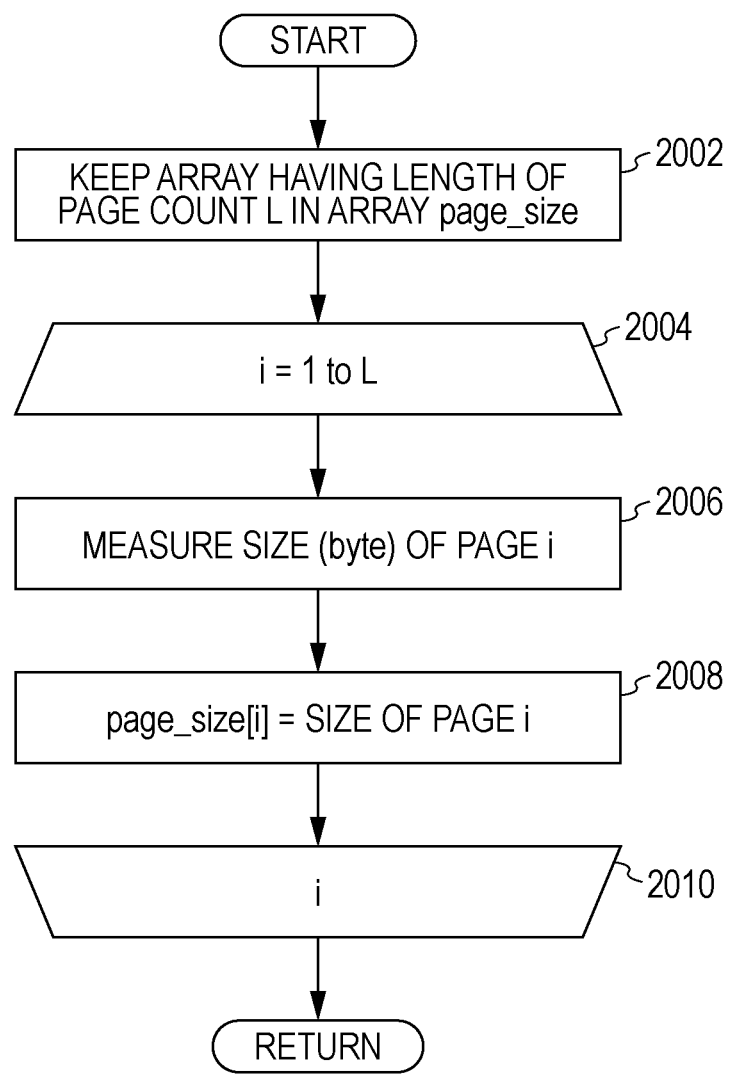
FIG. 20 is a flowchart illustrating the process of storing page sizes in double[ ] page_size.

Next, referring to the flowchart of FIG. 20, the process in which the measurement module 714 stores a page size in double[] page_size will be described. In step 2002, the measurement module 714 keeps an array having a length of a page count L in an array page_size.

The process from step 2004 to step 2010 is repeated with respect to i=1 to L. In step 2006, the measurement module 714 measures the size (byte) of page i. The size of page i is obtained, for example, by calling a predetermined API function of the operating system and obtaining the size of the HTML file of the page. In step 2008, the measurement module 714 stores the size of page i in page_size[i]. As a result of this process, the size of each page is stored in page_size[ ] in bytes.

Figure 21:
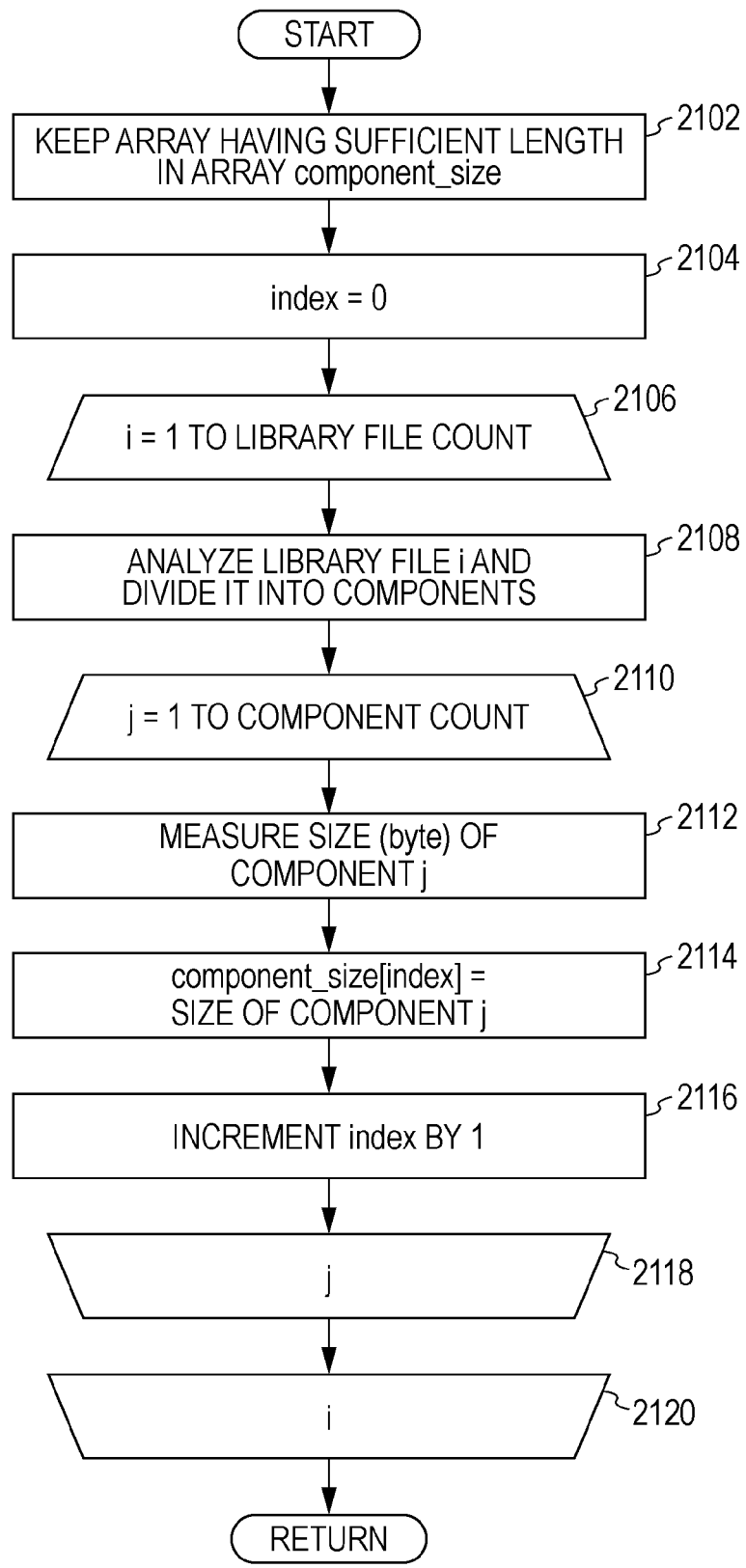
FIG. 21 is a flowchart illustrating the process of storing component sizes in double[ ] component_size.

Next, referring to the flowchart of FIG. 21, the process in which the measurement module 714 stores a component size in double[ ] component_size will be described. In step 2102, the measurement module 714 keeps an array having a sufficient length in an array component_size. In step 2104, index is set to 0.

The process from step 2106 to step 2120 is repeated with respect to all library files starting from a library file i=1.

In step 2108, the measurement module 714 analyzes the library file i and divides it into components.

The process from step 2110 to step 2118 is repeated with respect to all components starting with a component j=1.

In step 2112, the measurement module 714 measures the size (byte) of the component j. In step 2114, the measurement module 714 stores the size of the component j in component_size[index]. In step 2116, index is incremented by one. As a result of this process, the size of each component is stored in component_size[ ] in bytes.

Figure 22:
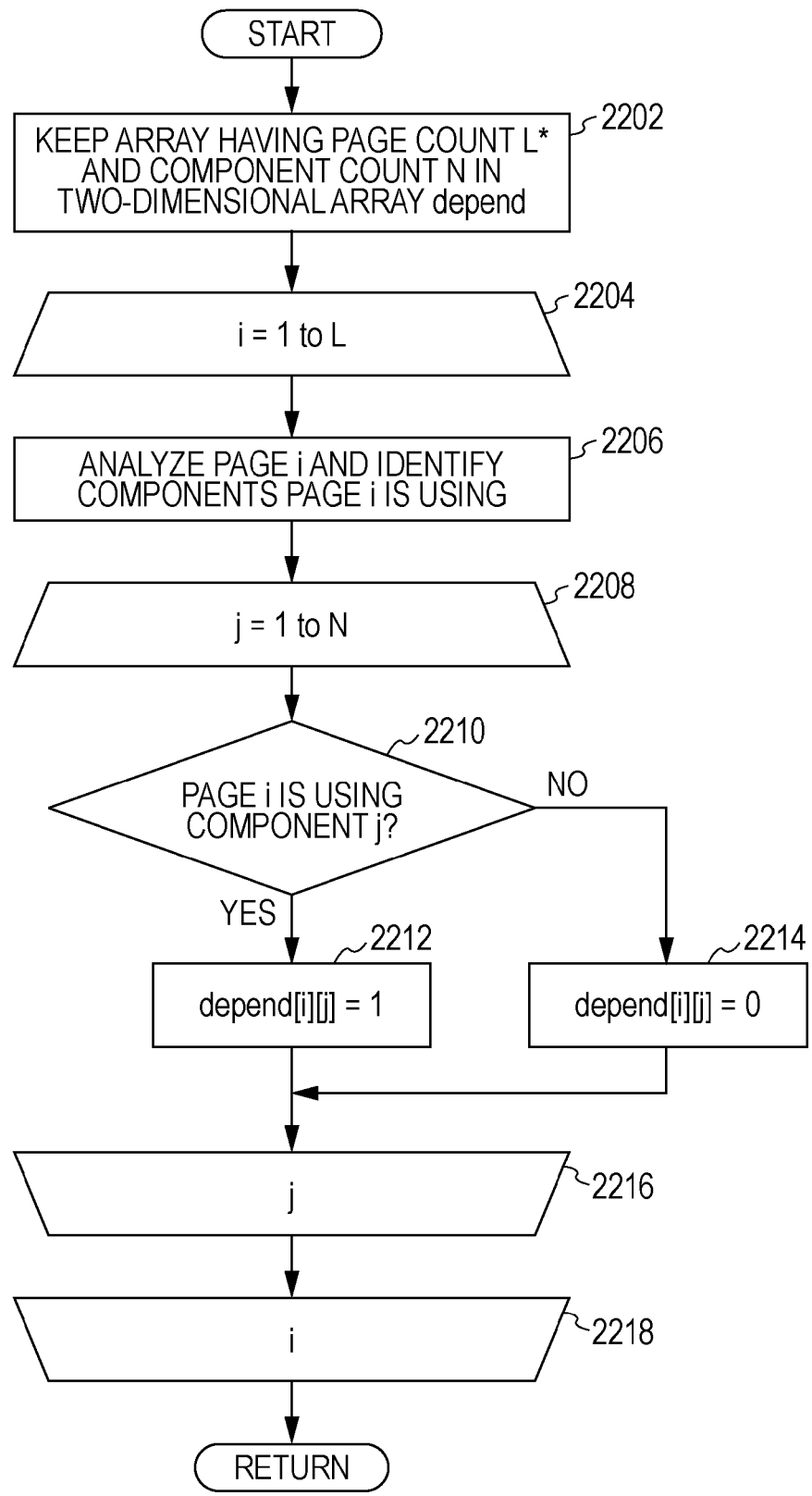
FIG. 22 is a flowchart illustrating the process of extracting dependencies and storing them in int[ ][ ] depend.

Next, referring to the flowchart of FIG. 22, the process in which the dependency extraction module 704 extracts a dependency and stores it in int[ ][ ] depend will be described. In step 2202, the dependency extraction module 704 keeps an array having a page count L* and a component count N in a two-dimensional array depend.

Steps 2204 to 2218 form a loop with respect to page i=1 to L.

In step 2206, the dependency extraction module 704 analyzes page i and identifies components the page i is using.

Steps 2208 to 2216 form a loop with respect to a component j=1 to N. In step 2210, the dependency extraction module 704 determines whether the page i is using the component j. If Yes, it sets 1 in depend[i][j] in step 2212; if No, it sets 0 in depend[i][j] in step 2214. When the loop from step 2208 to step 2216 completes with respect the components up to N, the dependence extraction module 704 proceeds to step 2218 and increments i by one, and returns to step 2204.

When the loop from step 2204 to step 2218 completes with respect to L, the process completes. As a result of this process, the dependency between each page and each component is stored in depend[ ][ ].

Figure 23:
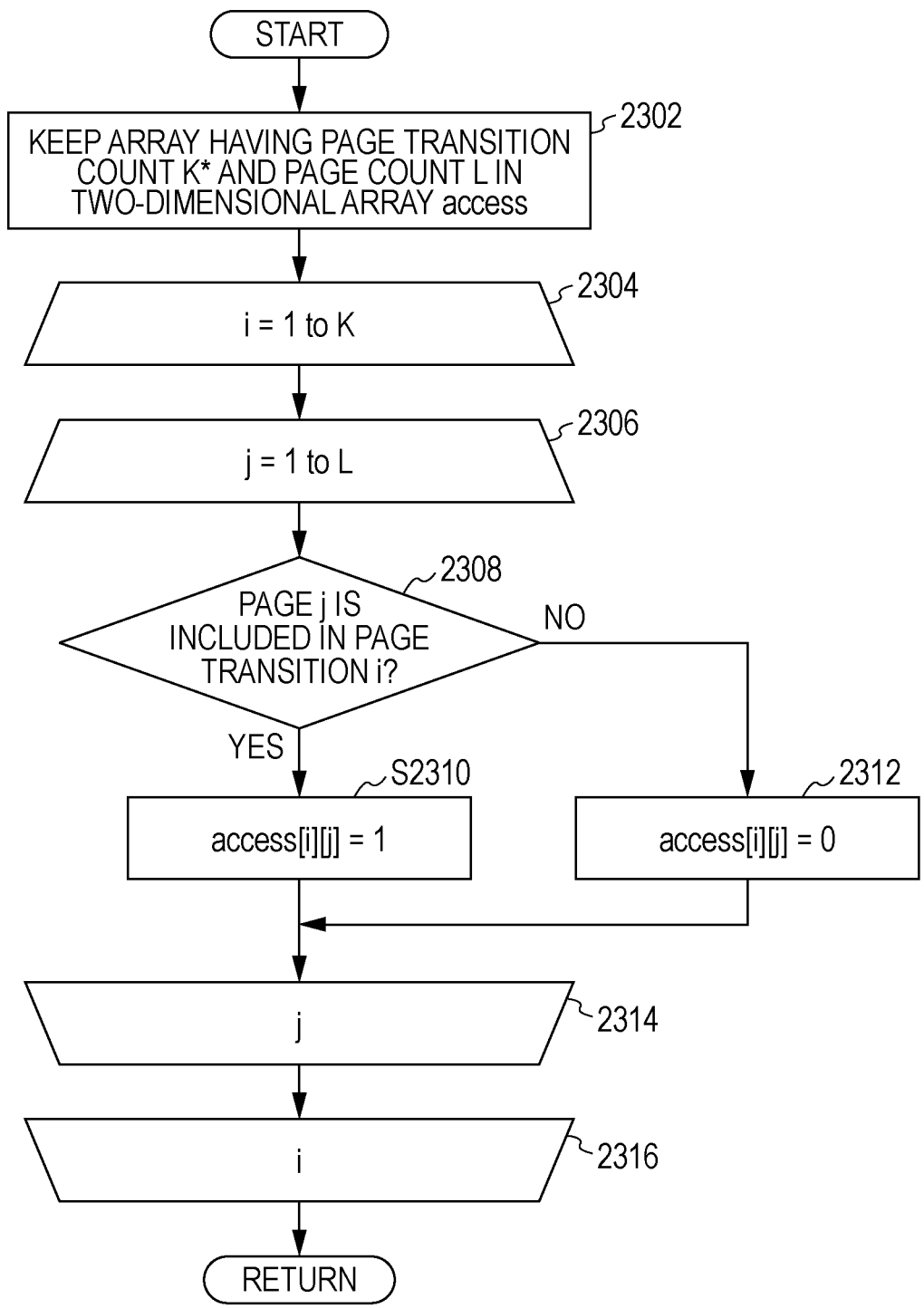
FIG. 23 is a flowchart illustrating the process of storing page transitions in int[ ][ ] access.

Next, referring to the flowchart of FIG. 23, the process in which the dependency extraction module 704 extracts a page transition and stores it in int[ ][ ] access will be described. In step 2302, the dependency extraction module 704 keeps an array having a page transition count K* and a page count L in a two-dimensional array access.

Steps 2304 to 2216 form a loop with respect to a page transition i=1 to K.

Steps 2306 to 2314 form a loop with respect to a page j=1 to L. In step 2308, the dependency extraction module 704 determines whether the page j is included in the page transition i. If Yes, it sets 1 in access[i][j] in step 2310; if No, it sets 0 in access[i][j] in step 2312. When the loop from steps 2304 to 2216 completes with respect to the page transitions up to K, the page transition information is stored in access[ ][ ].

Figure 24:
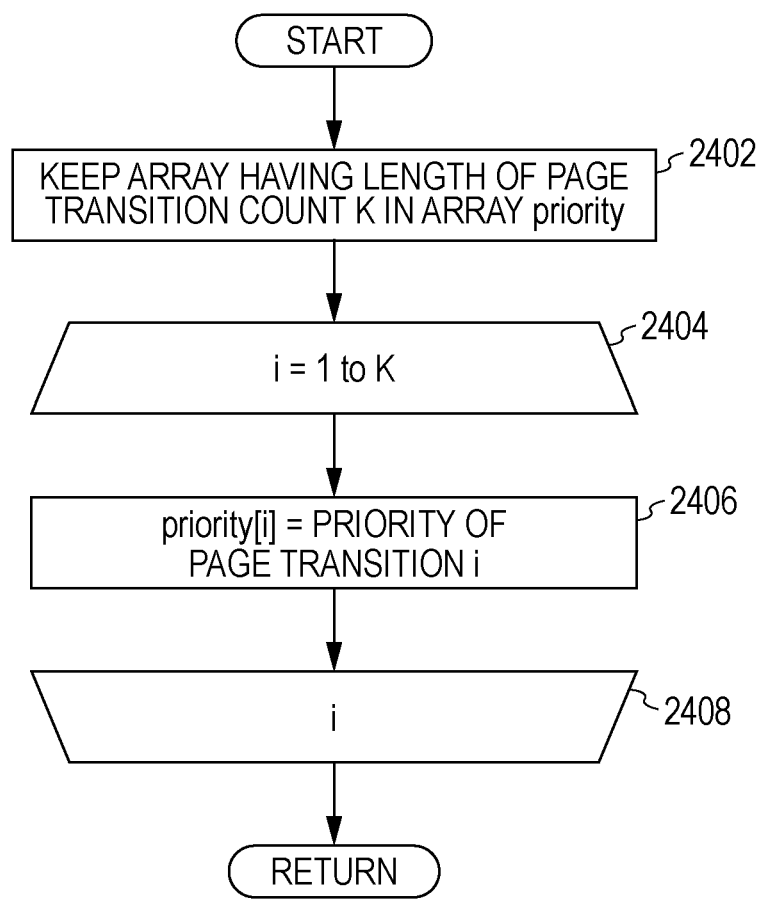
FIG. 24 is a flowchart illustrating the process of storing the priority of page transitions in double[ ] priority.

Next, referring to the flowchart of FIG. 24, the process in which the dependency extraction module 704 stores the priority of a page transition in double[ ] priority will be described. In step 2402, the dependency extraction module 704 keeps an array having a length of a page transition count K in an array priority.

Steps 2404 to 2408 form a loop with respect to a page transition i=1 to K. In step 2406, the dependency extraction module 704 inputs the priority of the page transition i in priority[i]. As a result of this process, the priority of each page transition is stored in priority[ ].

Figure 25:
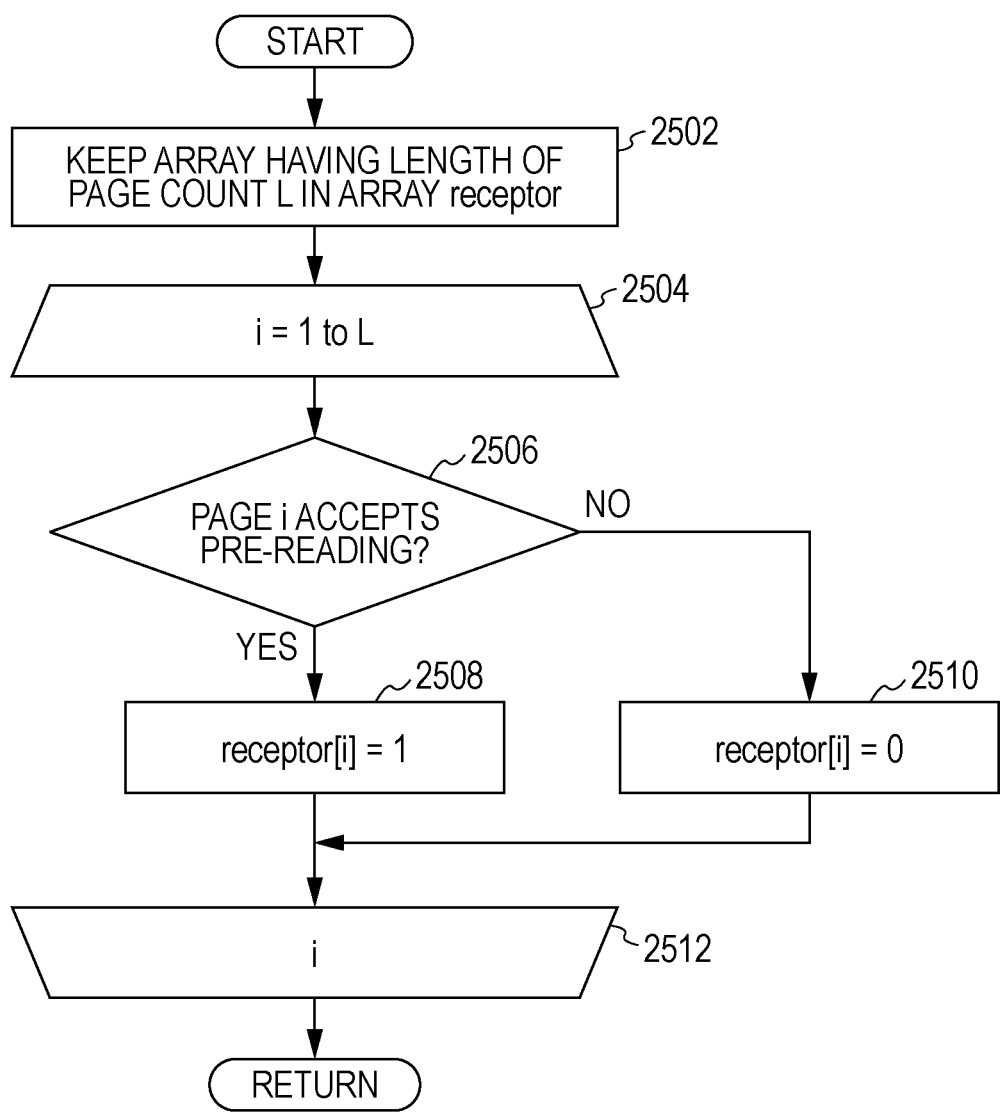
FIG. 25 is a flowchart illustrating the process of storing a determination as to whether each page accepts pre-reading of another page in double[ ] receptor.

Next, referring to the flowchart of FIG. 25, the process in which the dependency extraction module 704 stores a determination as to whether a page accepts pre-reading of another page in int[ ] receptor will be described. In step 2502, the dependency extraction module 704 keeps an array having a length of a page count L in an array receptor.

Steps 2504 to 2512 form a loop with respect to a page i=1 to L. In step 2506, the dependency extraction module 704 determines whether the page i accepts pre-reading. If Yes, it sets 1 in receptor[i] in step 2508; if No, it sets 0 in receptor[i] in step 2510. As a result of this process, information as to whether each page accepts pre-reading of another page is stored in receptor[ ].

Figure 26:
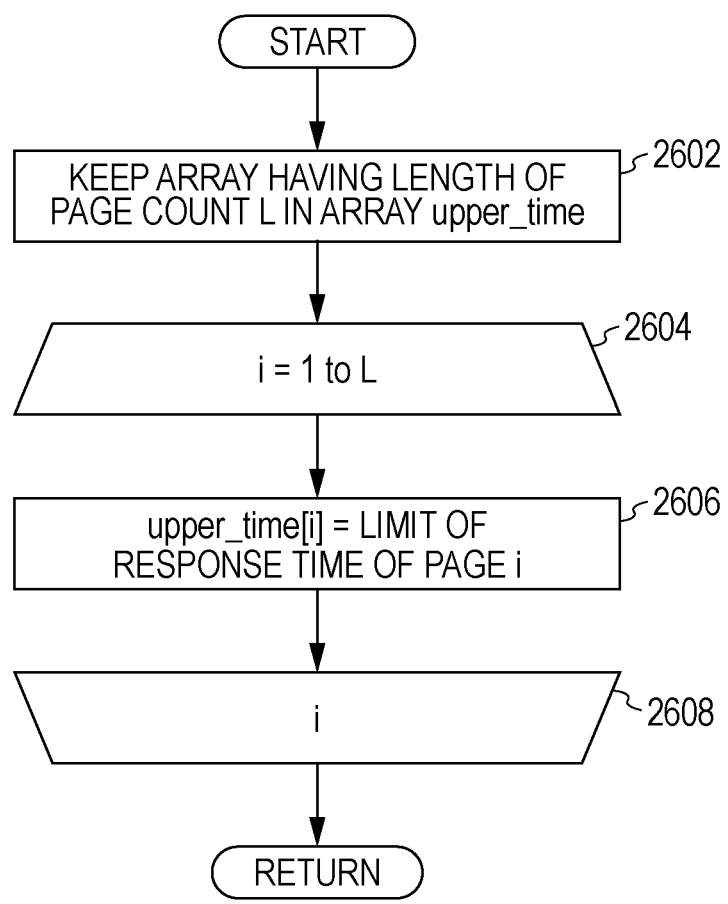
FIG. 26 is a flowchart illustrating the process of storing the upper limit of the response time in double[ ] upper_time.

Next, referring to the flowchart of FIG. 26, the process in which the parameter setting module 710 stores the upper limit of the response time in double[ ] upper_time will be described. In step 2602, the parameter setting module 710 keeps an array having a length of a page count L in an array upper_time.

Steps 2604 to 2608 form a loop with respect to a page i=1 to L. In step 2606, the parameter setting module 710 inputs the limit of the response time of the page i in upper_time[i]. As a result of this process, the limit of the response time of each page is stored in upper_time[ ].

Figure 27:
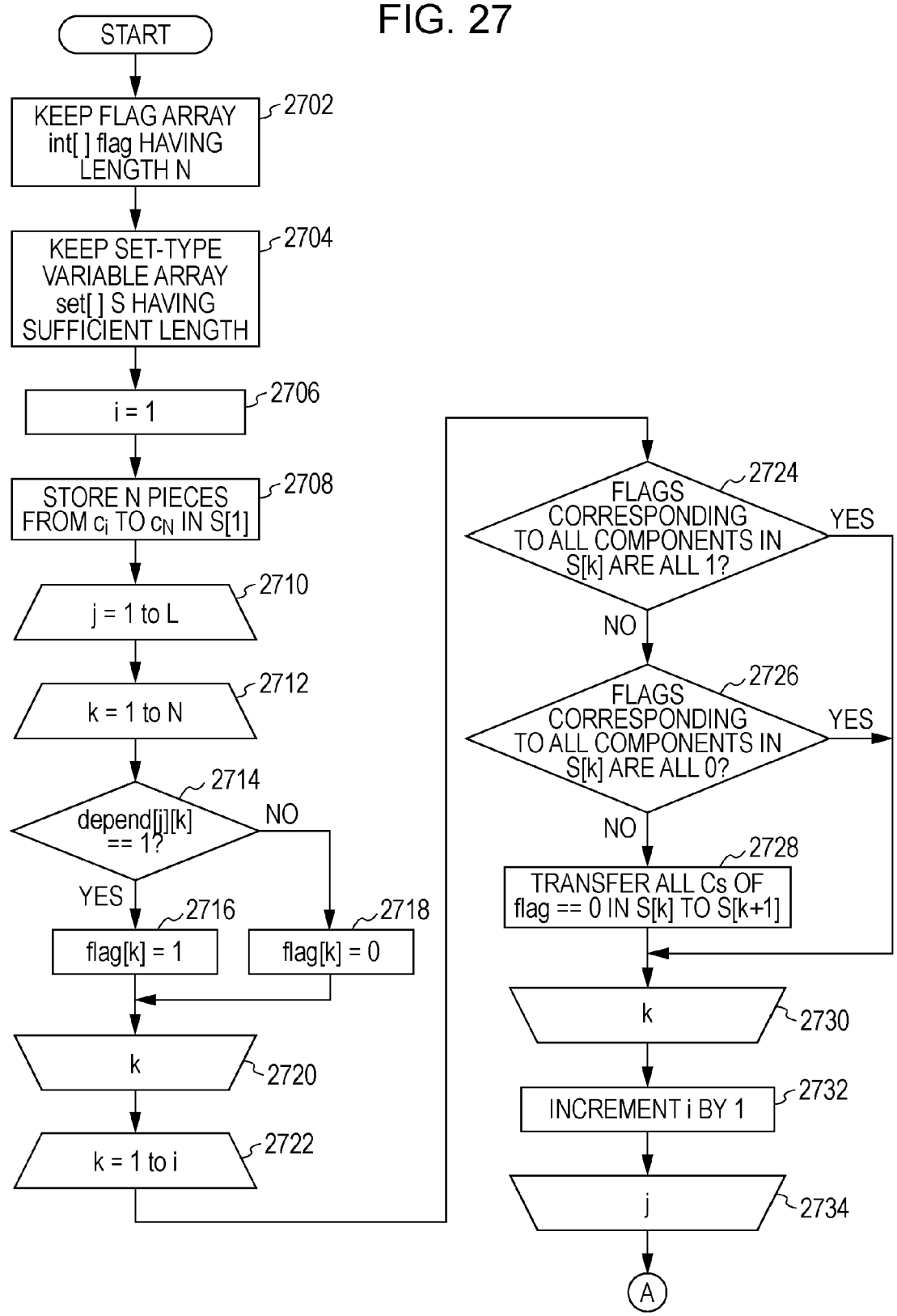
FIG. 27 is a flowchart illustrating the process of concatenating the same type of components using a combination of dependencies to reduce the number of components.
Figure 28:
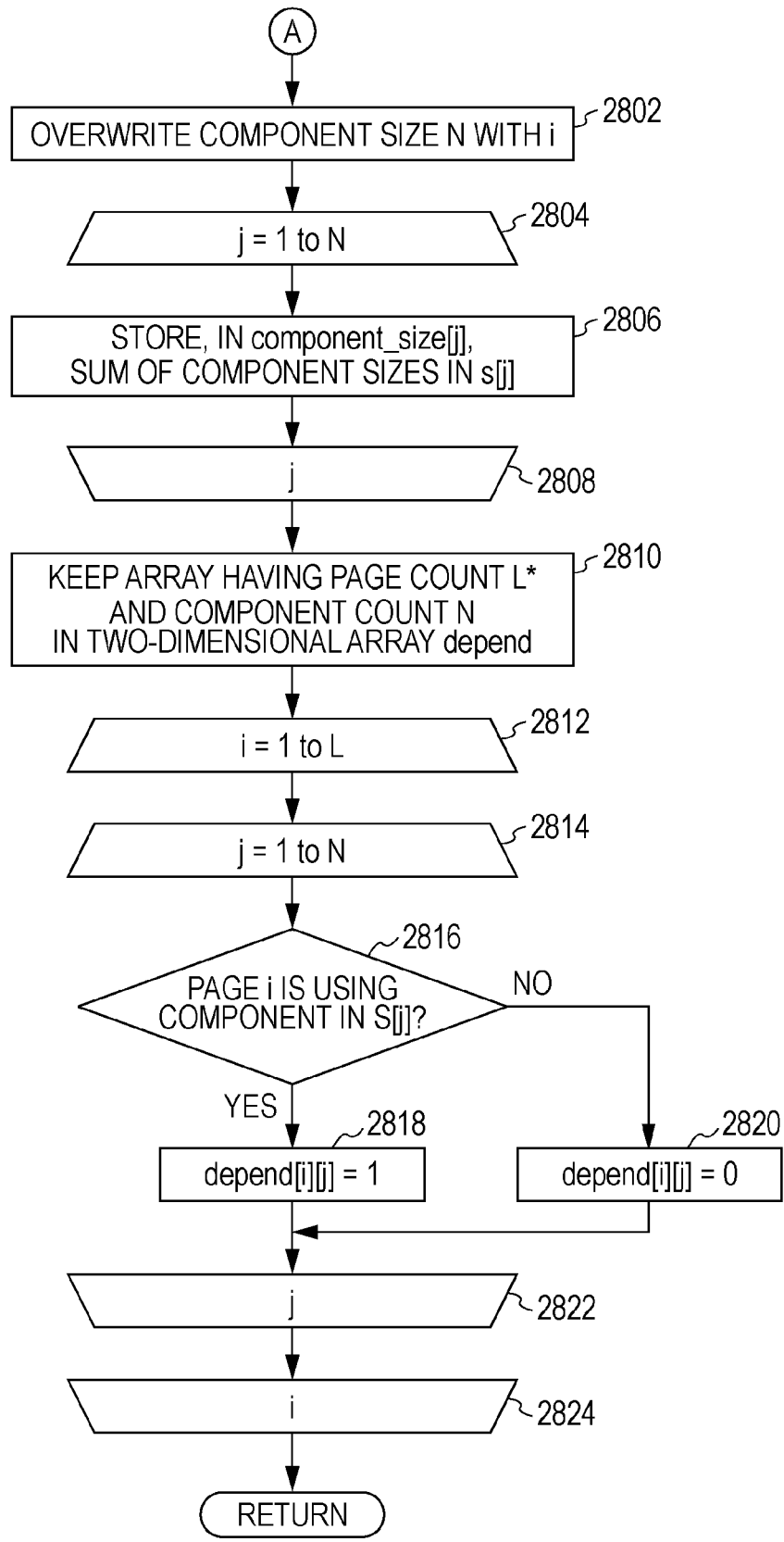
FIG. 28 is a flowchart illustrating the process of concatenating the same type of components using a combination of dependencies to reduce the number of components.

Next, referring to the flowcharts of FIGS. 27 and 28, the process in which the component concatenation module 706 concatenates the same type of components using a combination of dependencies to reduce the number of components will be described. In step 2702, the component concatenation module 706 keeps a flag array int[ ] flag having a length N.

In step 2704, the component concatenation module 706 keeps a set-type variable array set[ ] S having a sufficient length and sets 1 for i in step 2706.

In step 2708, the component concatenation module 706 stores N pieces from $c_i$ to $c_N$ in S[1].

The process from step 2710 to step 2734 is repeated with respect to j=1 to L. The process from step 2712 to step 2720 is repeated with respect to k=1 to N. In step 2714, the component concatenation module 706 determines whether page depend[j][k]==1. If Yes, it substitutes 1 into flag[k] in step 2716; if No, it substitutes 1 into flag[k] in step 2718.

After the loop from step 2712 to step 2720 completes with respect to N, the process from step 2722 to step 2734 is repeated with respect to k=1 to i. In step 2724, the component concatenation module 706 determines whether flags corresponding to all components in S[k] are i. If Yes, it simply proceeds to the next loop of k. If No, it determines in step 2726 whether flags corresponding to all components in S[k] are 0. If Yes, it simply proceeds to the next loop of k. If No, it transfers all cs of flag==0 in S[k] to S[k+1] in step 2728.

When the loop from step 2722 to step 2730 completes with respect to K, the component concatenation module 706 increments i by one in step 2732 and proceeds to the next loop of j in step 2734. When the loop from step 2710 to step 2734 completes with respect to L, the process proceeds to the flowchart of FIG. 28.

In step 2802, the component concatenation module 706 overwrites the component size N with i calculated in step 2728.

Steps 2804 to 2808 form a loop with respect to j=1 to N. In step 2806, the component concatenation module 706 stores, in component_size[j], the sum of component sizes in s[j].

When the loop from step 2804 to step 2808 completes with respect to N, the component concatenation module 706 keeps an array having a page count L* and a component count N in a two-dimensional array depend in step 2810.

Steps 2812 to 2824 form a loop with respect to i=1 to L, and steps 2814 to 2822 form a loop with respect to j=1 to N.

Figure 29:
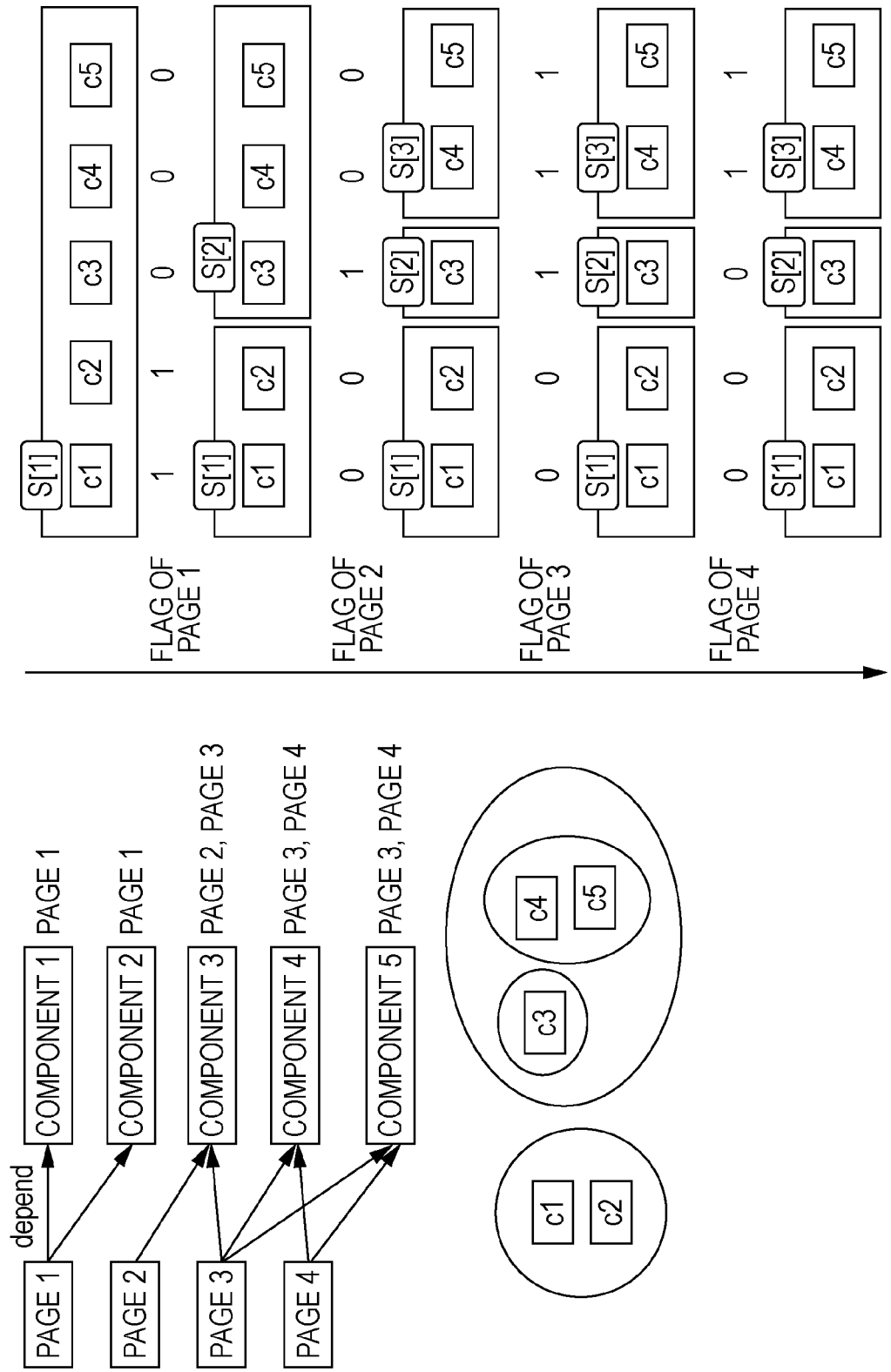
FIG. 29 is a schematic diagram illustrating an aspect of the process of concatenating the same type of components using a combination of dependencies to reduce the number of components.

In step 2816, the component concatenation module 706 determines whether the page i is using a component in S[j]. If Yes, it sets 1 in depend[i][j] in 2818; if No, it sets 0 in depend[i][j] in 2820. When the loop with respect to i=1 to L and an inner loop with respect to j=1 to N completes, this process completes. FIG. 29 is a diagram schematically showing an aspect of the processes of FIGS. 27 and 28.

Figure 30:
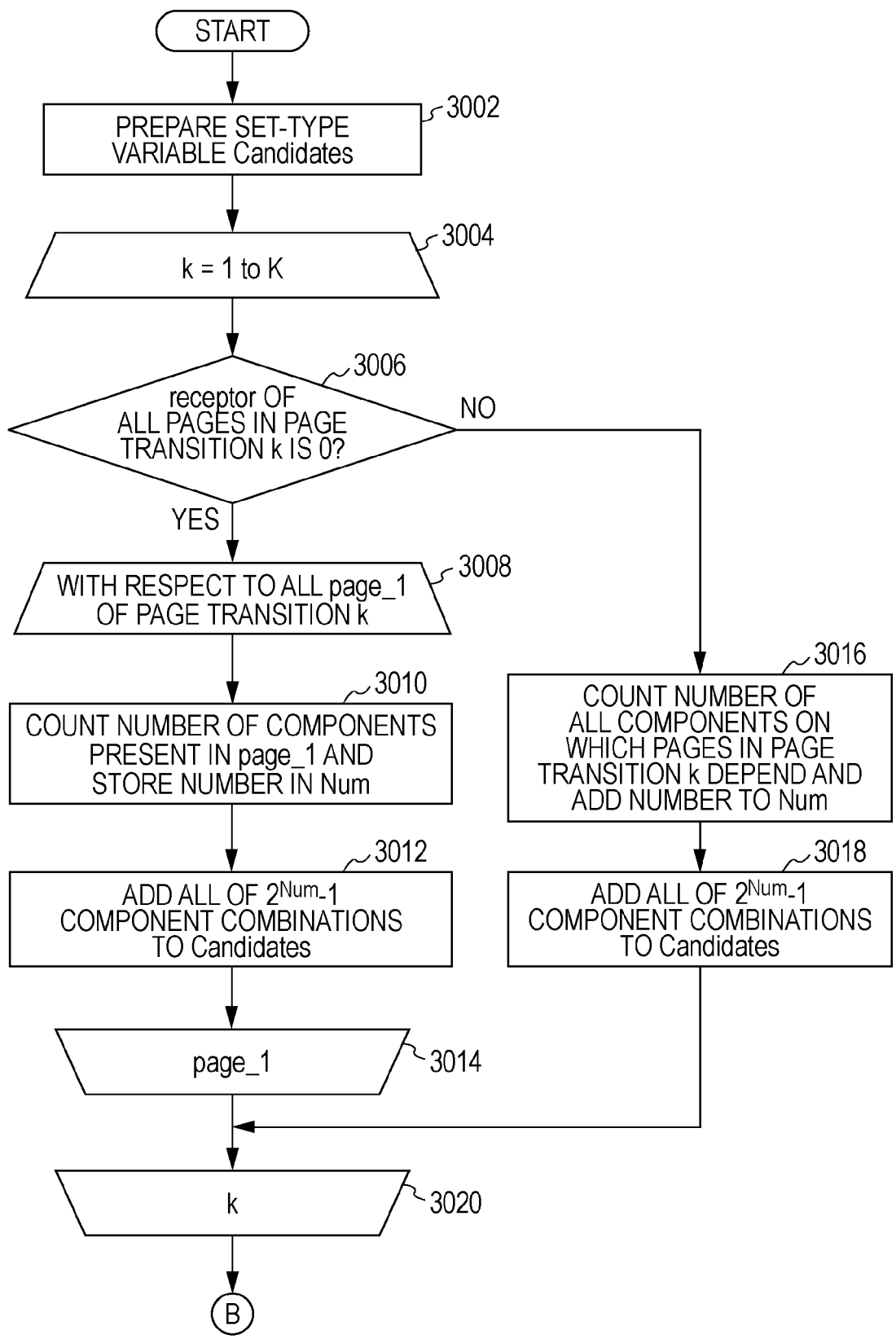
FIG. 30 is a flowchart illustrating the process of generating candidate search files and storing them in int[ ][ ] include.

Next, referring to the flowcharts of FIGS. 30 and 31, the process in which the candidate search file generation module 712 generates a candidate search file and stores it in int[ ][ ] include will be described.

In step 3002, the candidate search file generation module 712 prepares a set-type variable Candidates. Steps 3004 to 3020 form a loop of with respect to k=1 to K.

In step 3006, the candidate search file generation module 712 determines whether receptor of all pages included in a page transition k is 0. If Yes, it performs the process from step 3008 to step 3014, which is a loop with respect to all pages_ included in the page transition k.

During the process from step 3008 to step 3014, the candidate search file generation module 712 counts the number of components present in the page 1 and stores the counted number in Num in step 3010 and adds all of $2^{Num}-1$ combinations of components to Candidates in step 3012. The candidate search file generation module 712 then proceeds to step 3020 and increments k by one.

If the candidate search file generation module 712 determines that receptor of all pages included in the page transition k is not 0, it counts the number of components on which pages included in the page transition k depend and adds the counted number to Num in step 3016.

The candidate search file generation module 712 then adds all of $2^{Num}-1$ combinations of components to Candidates in step 3018 and proceeds to step 3020 and increments k by one.

Figure 31:
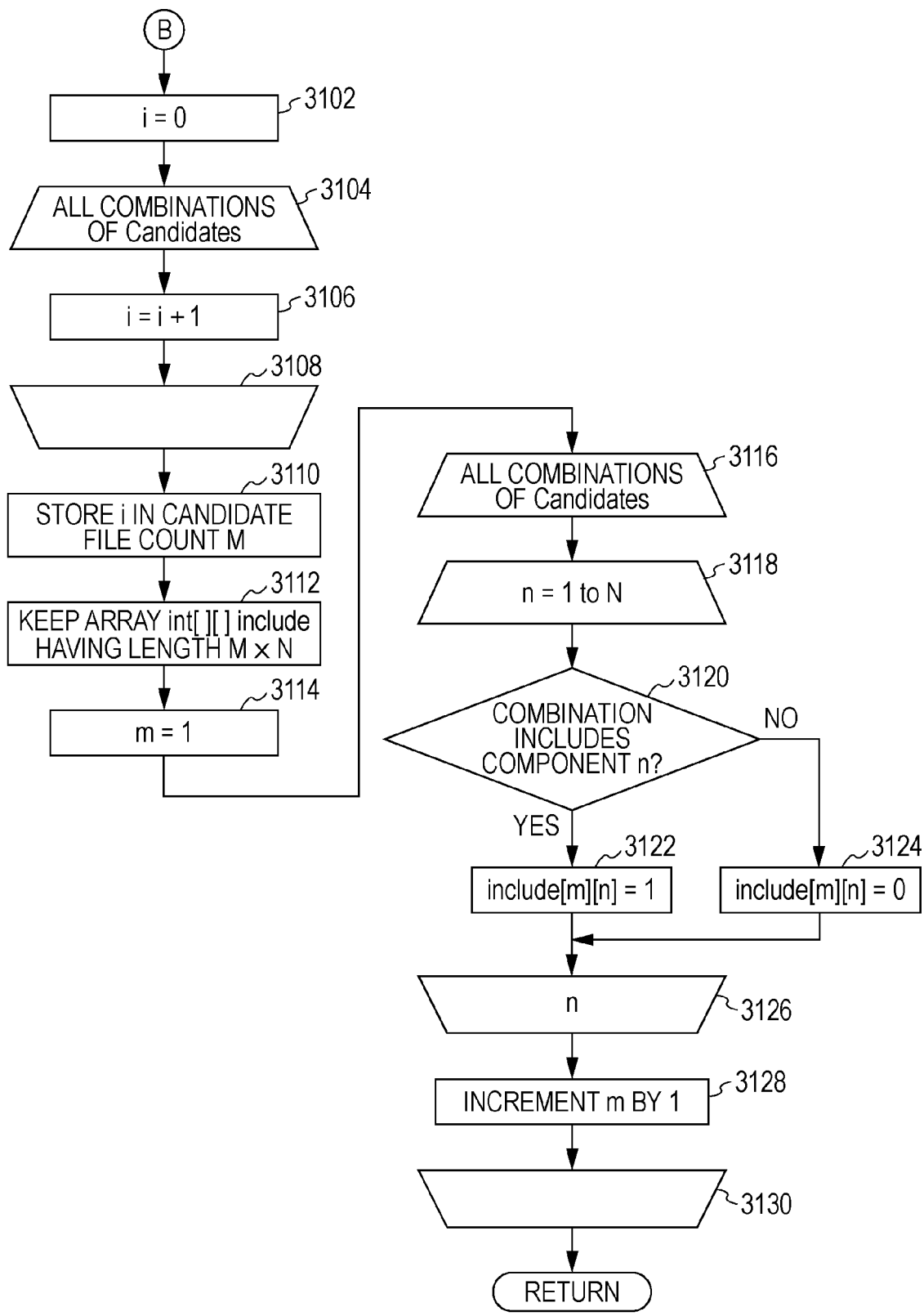
FIG. 31 is a flowchart illustrating the process of generating candidate search files and storing them in int[ ][ ] include.

When the loop from step 3004 to step 3020 completes with respect to the page transitions up to K, the process proceeds to the flowchart of FIG. 31. The candidate search file generation module 712 sets 0 for i in step 3102 and then performs the loop from step 3104 to step 3108 with respect to all combinations of Candidates.

Since the loop includes step 3106 in which i is incremented by one, the completion of the loop from step 3104 to step 3108 means that the number of all combinations of Candidates is stored in i. In step 3110, the candidate search file generation module 712 stores i in the number of candidate files, M.

In 3112, the candidate search file generation module 712 keeps an array int[ ][ ] include having a length M×N and, in step 3114, sets 1 for m.

The process from step 3116 to step 3130 is a loop with respect to all combinations of Candidates. The inner process from step 3118 to step 3126 is a loop with respect to n=1 to N.

In step 3120, the candidate search file generation module 712 determines whether the combination includes a component n. If Yes, it sets 1 in include[m][n] in step 3122; if No, it sets 0 in include[m][n] in step 3124.

Next, when the loop from step 3118 to step 3126 completes with respect to the components up to N, the candidate search file generation module 712 increments m by one in step 3128 and proceeds to the next combination of Candidates in step 3130.

When the loop from step 3116 to step 3130 completes, the candidate search file generation process completes.

Figure 32:
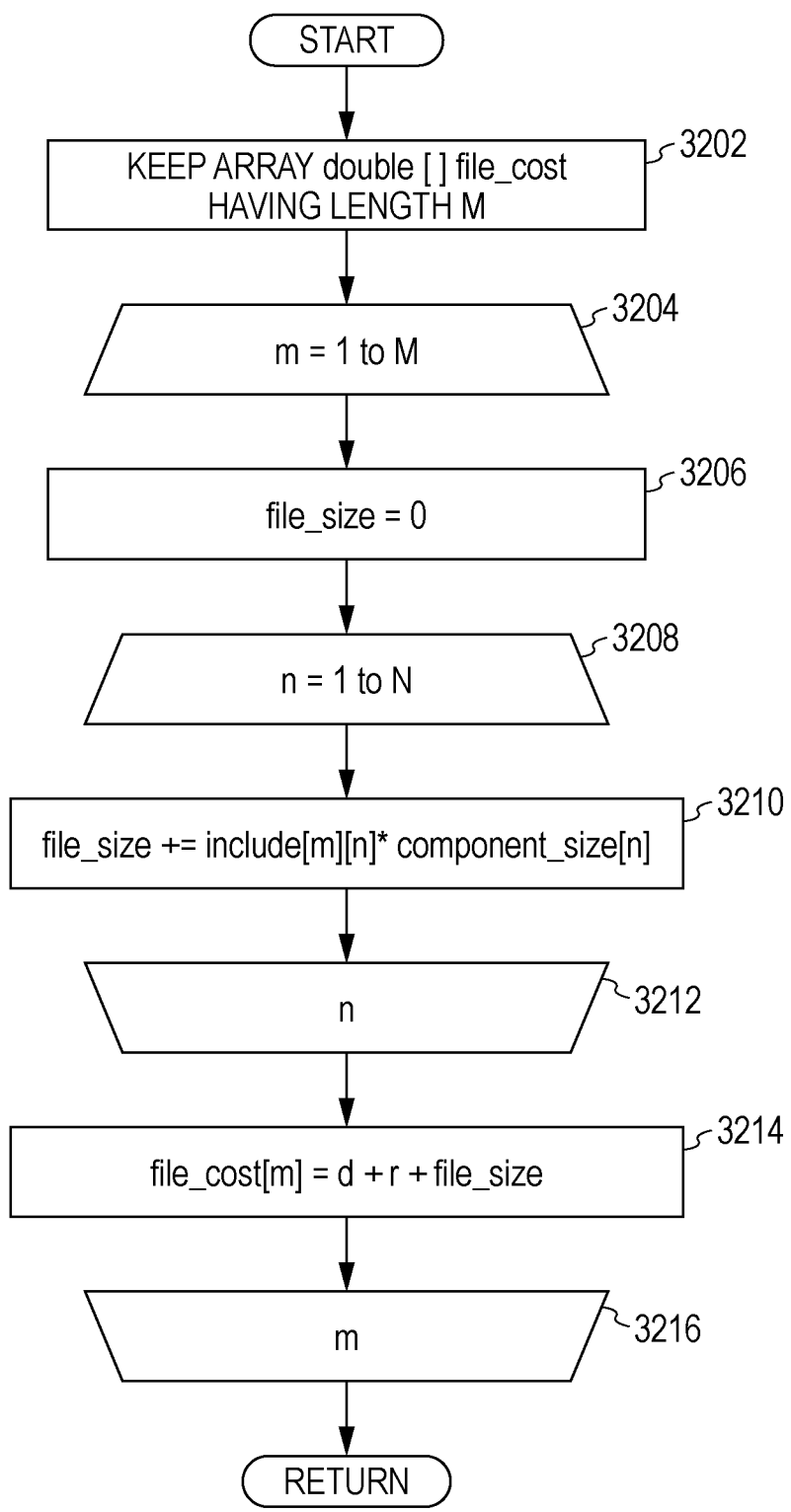
FIG. 32 is a flowchart illustrating the process of estimating the load times of the generated candidate search files and storing them in double[ ] file_cost.

Next, referring to the flowchart of FIG. 32, the process in which the estimated load time calculation module 716 estimates the load time of the generated candidate file and stores it in double[ ] file_cost will be described.

In step 3202, the estimated load time calculation module 716 keeps an array double [ ] file_cost having a length M.

The process from step 3204 to step 3216 is a loop with respect to m=1 to M. The estimated load time calculation module 716 sets 0 in file_size in step 3206.

The process from step 3208 to step 3212 is a loop with respect to n=1 to N. In step 3210 within the loop, the estimated load time calculation module 716 calculates file_size+=include[m][n]* component_size[n].

After the loop from step 3208 to step 3212 completes with respect to N, the estimated load time calculation module 716 calculates file_cost[m]=d+r* file_size in step 3214. The value d is obtained in the process of the flowchart of FIG. 18, and the value r is obtained in the process of the flowchart of FIG. 19.

Completion of the loop from step 3204 to step 3216 with respect to M means that file_cost[ ] is filled with the values.

Figure 33:
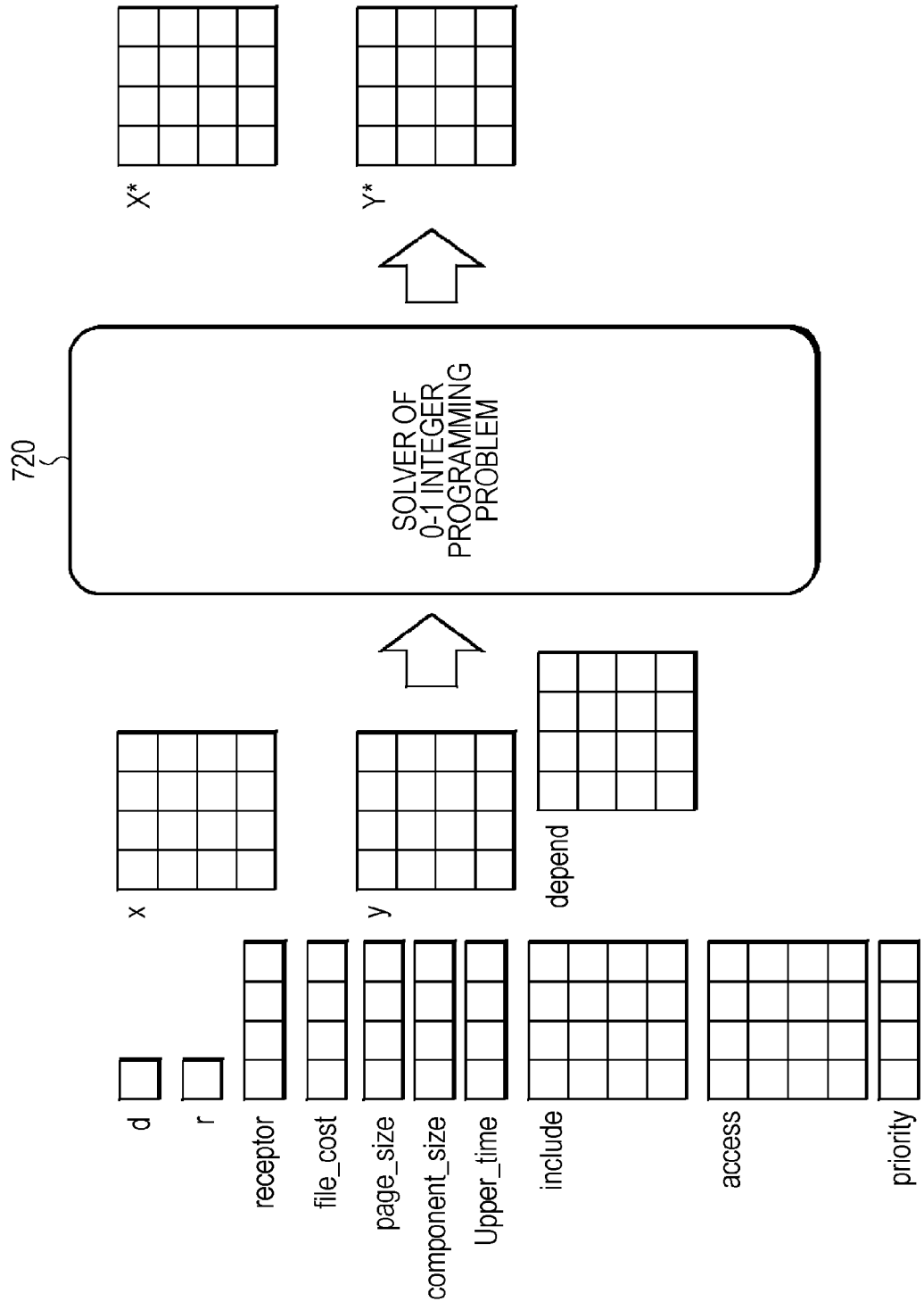
FIG. 33 is a diagram schematically illustrating an input and an output of a solver.

FIG. 33 is a diagram schematically showing an aspect where the values calculated thus far are inputted into the solver 720 to obtain an optimal value. This corresponds to step 1726 of FIG. 17. That is, d, r, receptor[ ], file_cost[ ], page_size[ ], component_size[ ], Upper_time[ ], include[][], access[][], priority[], x[][], and y[][]. depend[][] are inputted into the solver 720 to obtain X*[][], Y*[][].

At that time, the solver 720 solves the minimization of the value of Formula 7, which is already shown, under Formula 8 acting as constraint conditions.

$$\sum_{k=1}^{K} \sum_{m=1}^{M} p_k \cdot y_{km} \cdot \text{file\_cost}_m \qquad \text{[Formula 7]}$$

$$\sum_{m=1}^{M} x_{lm} \cdot \text{include}(m, n) \geq 1 (\forall \text{ depend}(1, n) = 1) \qquad \text{[Formula 8]}$$

$$y_{km} \geq \frac{1}{L} \sum_{l=1}^{L} \text{access}(k, 1) \cdot x_{lm} (k = 1, \ldots, K, m = 1, \ldots, M)$$

$$y_{km} \geq \frac{1}{L} \sum_{l=1}^{L} \text{access}(k, 1) \cdot x_{lm} +$$

$$1 - \frac{1}{L} (k = 1, \ldots, K, m = 1, \ldots, M)$$

$$x_{lm} \in (0, 1)(l = 1, \ldots, L, m = 1, \ldots, M)$$

$$y_{km} \in (0, 1)(k = 1, \ldots, K, m = 1, \ldots, M)$$

Figure 34:
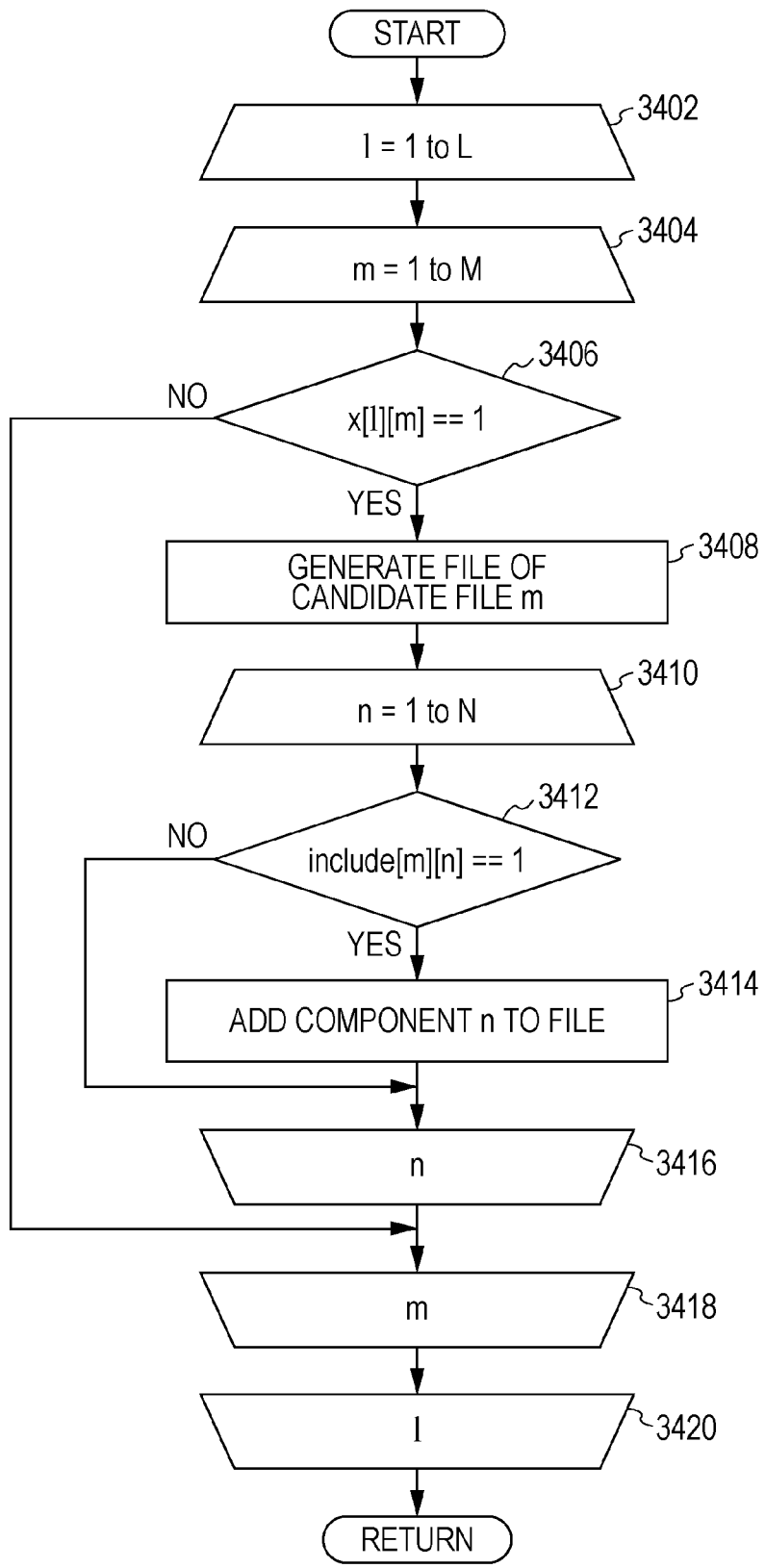
FIG. 34 is a flowchart illustrating the process of reconfiguring a library file from an output x*.

Next, referring to the flowchart of FIG. 34, the process in which the reconfiguration module 722 reorganizes a library file from an output x* will be described.

In step 3402, the reconfiguration module 722 starts the loop from step 3402 to step 3420 with respect to l=1 to L.

Within the loop from step 3402 to step 3420, the reconfiguration module 722 performs the loop from step 3404 to step 3418 with respect to m=1 to M.

In step 3406 within the loop from step 3404 to step 3418, the reconfiguration module 722 determines whether x[l][m]==1. x[ ][ ] refers to what is denoted by X* in FIG. 33.

If x[l][m]==1, the reconfiguration module 722 generates a file of a candidate file m in step 3406 and then performs the loop from step 3410 to step 3416 with respect to n=1 to N.

In step 3412 within the loop from step 3410 to step 3416, the reconfiguration module 722 determines whether include [m][n]==1. If Yes, it adds a component n to the file and increments n by one in step 3416; if No, it simply increments n by one in step 3416.

When the loop from step 3410 to step 3416 completes with respect to the components up to N, the reconfiguration module 722 increments m by one in step 3418.

Back in step 3406, if not x[l][m]==1, the reconfiguration module 722 simply increments m by one in step 3418 and returns to step 3404.

When the loop from step 3404 to step 3418 completes with respect to M, the reconfiguration module 722 increments l by one in step 3420 and returns to step 3402.

Figure 35:
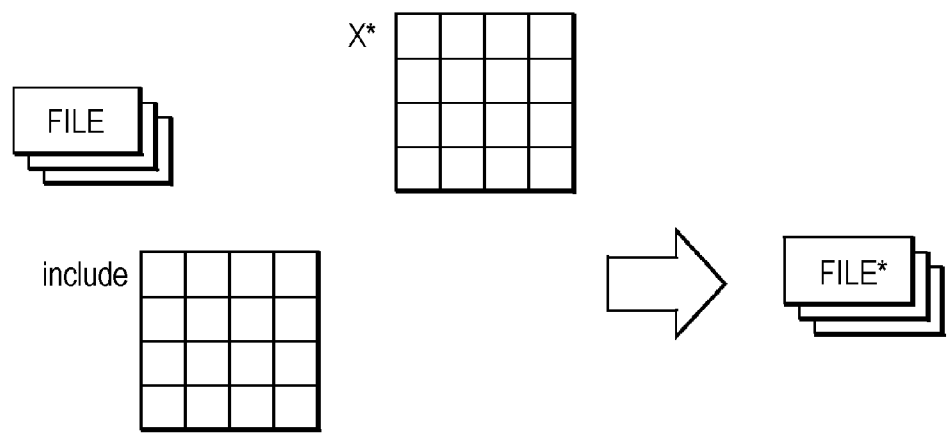
FIG. 35 is a diagram schematically illustrating the process of reconfiguring a library file from an output x*.

When the loop from step 3402 to step 3420 completes with respect to L, the process completes. FIG. 35 schematically shows the above-mentioned process.

Figure 36:
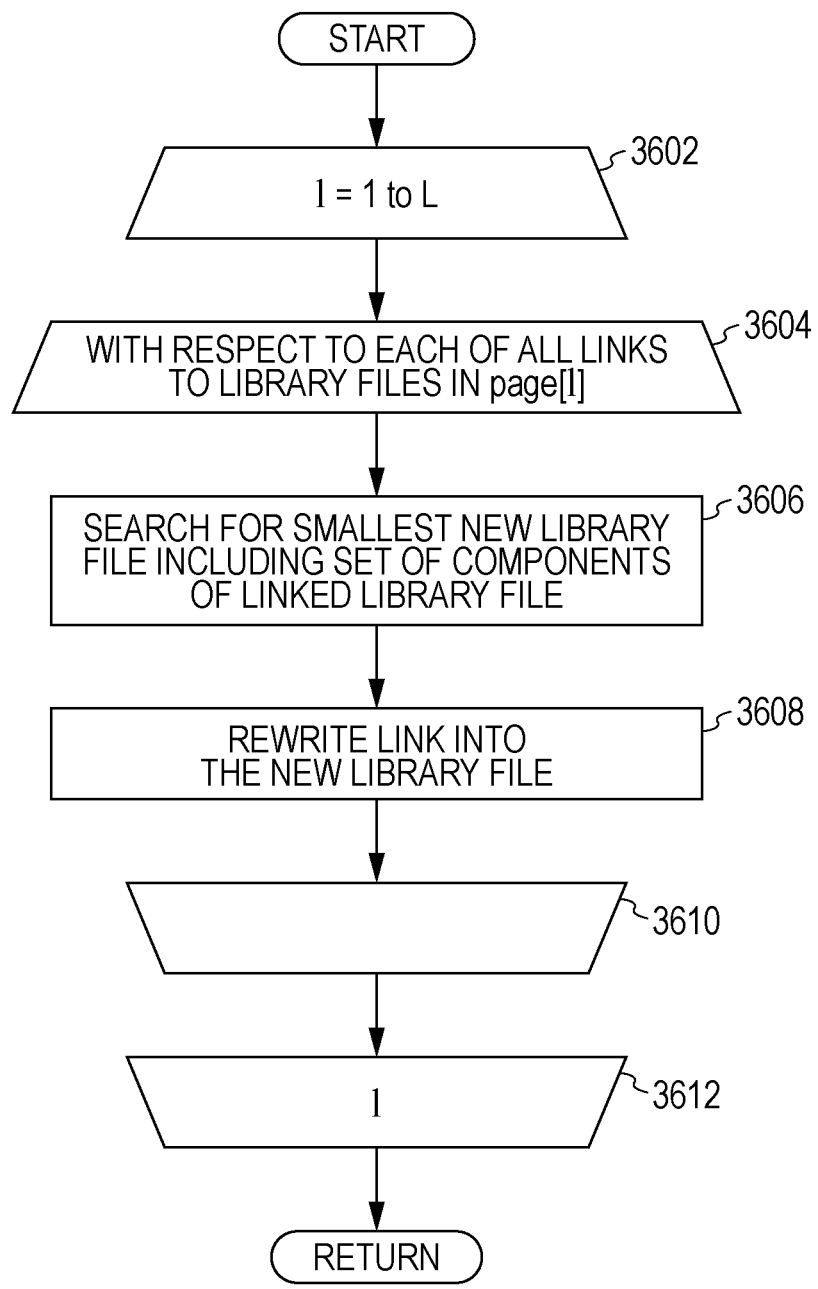
FIG. 36 is a flowchart illustrating the process of replacing a link to the library file of each page with a link to a newly generated library file.

Next, referring to the flowchart of FIG. 36, the process in which the reconfiguration module 722 rewrites a link to the library file of a page into a link to a newly generated library file will be described.

The reconfiguration module 722 performs the loop from step 3602 to step 3412 with respect to l=1 to L.

Within the loop from step 3602 to step 3612, the reconfiguration module 722 performs the loop from step 3604 to step 3610 with respect to all links to library files in page[l].

In step 3606 within the loop from step 3604 to step 3612, the reconfiguration module 722 searches for a smallest library file including a set of components of a linked library file.

In step 3608, the reconfiguration module 722 rewrites a link into a link to the new library file.

When the process from step 3604 to step 3610 completes with respect to all links to library files in page[l], the reconfiguration module 722 proceeds to step 3612 and increments l by one. The reconfiguration module 722 then returns to step 3602 and restarts the process from step 3604.

Figure 37:
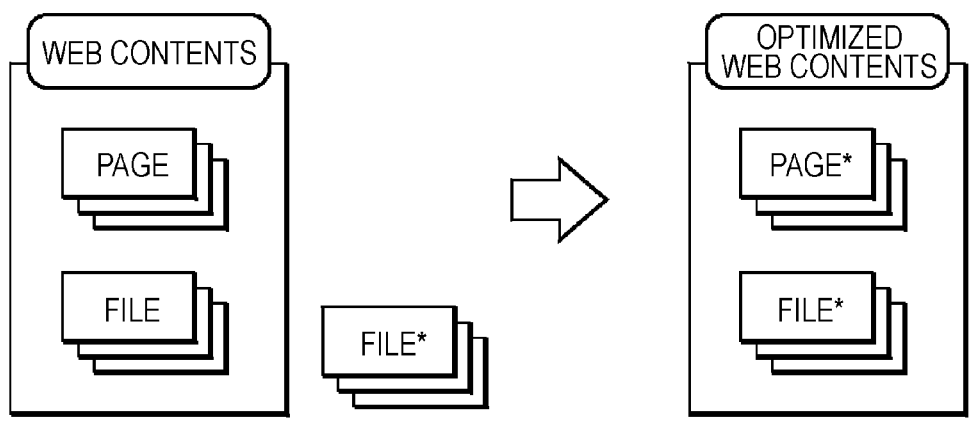
FIG. 37 is a diagram schematically illustrating the process of replacing a link to the library file of each page with a link to a newly generated library file.

When l reaches L in step 3602, the process completes. FIG. 37 schematically shows the above-mentioned process.

While the present invention has been described on the basis of the specific embodiment, it should be understood that the invention can be realized by any computer hardware and platform. Further, a processing system according to the present invention can be used in the same way whether on a local client or on a server.

What we claim is:

1. A computer-implemented method for reconfiguring a web page using a computer to reduce load time of the web page required when viewing the web page through a browser, the method comprising the steps of:
   extracting dependencies between (i) pages, (ii) files, and (iii) components of the web page stored in a storage unit of the computer;
   measuring (i) a network delay value, (ii) a transfer efficiency value, and (iii) a component size;
   estimating load time of a candidate file using information of (i) the network delay value, (ii) the transfer efficiency value, (iii) the dependencies, and (iv) the component size;
   generating an integer programming problem using the information of the candidate file, wherein the integer programming problem minimizes an object function representing the load time of the web page by analyzing the web page and generating a (i) dependency, (ii) an inclusion relationship and (iii) a loading relationship in the form of a 0-1 table;
   solving the integer programming problem using a solver;
   reconfiguring a library file from a solution to the integer programming problem obtained by the solver;
   reconfiguring the web page by replacing a link to the library file of each page with a link to the reconfigured library file; and
   wherein, at least one step is carried out using a computer device.

2. The method according to claim 1, the method further comprising the step of:
   concatenating same type of components using a combination of the extracted dependencies.

3. The method according to claim 1, the method further comprising the step of:
   connecting the files using information of the inclusion relationship, wherein at least one file includes components so as to form the integer programming problem into a linear integer programming problem.

4. The method according to claim 1, the method further comprising the step of:
   determining a set of successively accessed pages.

5. The method according to claim 4, wherein a browser cache effect is added to a constraint condition of the integer programming problem, wherein the effect is such that a cost of an identical file is added only once.

6. The method according to claim 1, the method further comprising the steps of:
   solving a linear programming problem to find a relaxation solution to find a candidate file by using the solver; and
   adding the found candidate file to solve the integer programming problem by using the solver.

7. A non-transitory computer readable storage device comprising a computer readable program which, when implemented, cause a computer to carry out the steps of a method for reconfiguring a web page using a computer to reduce load time of the web page required when viewing the web page through a browser, wherein the method comprises the steps of:
   extracting dependencies between (i) pages, (ii) files, and (iii) components of the web page;
   measuring (i) a network delay value, (ii) a transfer efficiency value, and (iii) a component size;
   estimating load time of a candidate file using information of (i) the network delay value, (ii) the transfer efficiency value, (iii) the dependencies, and (iv) the component size;
   generating an integer programming problem using the information of the candidate file, wherein the integer programming problem minimizes an object function representing the load time of the web page by analyzing the web page and generating (i) a dependency, (ii) an inclusion relationship, and (iii) a loading relationship in the form of a 0-1 table;
   solving the integer programming problem using a solver;
   reconfiguring a library file from a solution to the integer programming problem obtained by the solver; and
   reconfiguring the web page by replacing a link to the library file of each page with a link to the reconfigured library file.

8. The device according to claim 7, wherein the device causes the computer to further perform the step of:
   concatenating same type of components using a combination of the extracted dependencies.

9. The device according to claim 7, wherein the device causes the computer to further perform the step of:
   connecting the files using information of the inclusion relationship, wherein at least one file includes components so as to form the integer programming problem into a linear integer programming problem.

10. The device according to claim 7, wherein the device causes the computer to further perform the step of:
    determining a set of successively accessed pages.

11. The device according to claim 10, wherein a browser cache effect is added to a constraint condition of the integer programming problem, wherein the effect is such that a cost of an identical file is added only once.

12. The device according to claim 7, wherein the device causes the computer to further perform the steps of:
    solving a linear programming problem to find a relaxation solution to find a candidate file by using the solver; and
    adding the found candidate file to solve the integer programming problem by using the solver.

13. A system for reconfiguring a web page using a computer to reduce load time of the web page required when viewing the web page through a browser, the system comprising:
    a non-transitory storage unit that stores (i) pages, (ii) files, and (iii) components of the web page;
    a dependency extraction module that extracts dependencies between (i) pages, (ii) files, and (iii) components of the web page stored in the storage unit;
    a measurement module that measures (i) a network delay value, (ii) a transfer efficiency value, and (iii) a component size;
    an estimated load time calculation module that estimates load time of a candidate file using information of (i) the network delay value, (ii) the transfer efficiency value, (iii) the dependencies, and (iv) the component size;
    an integer programming problem generation module that generates an integer programming problem using the information of the candidate file, wherein the integer programming problem minimizes an object function representing the load time of the web page by analyzing the web page and generating a (i) dependency, (ii) an inclusion relationship, and (iii) a loading relationship in the form of a 0-1 table;

a solver that has the function of solving the integer programming problem;

a reconfiguration module that reorganizes a library file from a solution to the integer programming problem obtained by the solver; and a reconfiguration module that reorganizes the web page by replacing a link to the library file of each page with a link to the reorganized library file.

14. The system according to claim 13, further comprising:
a component concatenation module for concatenating the same type of components using a combination of the extracted dependencies.

15. The system according to claim 13, further comprising:
    an integer programming problem generation module that connects the files using information of the inclusion relationship where a file includes components so as to form the integer programming problem into a linear integer programming problem.

16. The system according to claim 13, further comprising:
    means that determines a set of successively accessed pages.

17. The system according to claim 16, wherein a browser cache effect is added to a constraint condition of the integer programming problem, wherein the effect is such that a cost of an identical file is added only once.

18. The system according to claim 13, wherein the solver has a function of solving a linear programming problem to find a relaxation solution to find a candidate file, and a function of adding the found candidate file to solve the integer programming problem.

* * * * *